(12) United States Patent
Ushio et al.

(10) Patent No.: US 11,542,201 B2
(45) Date of Patent: Jan. 3, 2023

(54) ZIRCONIA LAYERED BODY

(71) Applicant: TOSOH CORPORATION, Yamaguchi (JP)

(72) Inventors: Yuki Ushio, Yamaguchi (JP); Yuuki Ito, Yamaguchi (JP); Sho Azechi, Yamaguchi (JP); Hiroyuki Fujisaki, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

(21) Appl. No.: 16/801,756

(22) Filed: Feb. 26, 2020

(65) Prior Publication Data

US 2020/0283341 A1    Sep. 10, 2020

(30) Foreign Application Priority Data

Mar. 7, 2019  (JP) .............................. JP2019-041310
Mar. 7, 2019  (JP) .............................. JP2019-041321

(51) Int. Cl.
*C04B 35/48*   (2006.01)
*C04B 16/06*   (2006.01)

(52) U.S. Cl.
CPC ............ *C04B 35/48* (2013.01); *C04B 16/065* (2013.01); *C04B 16/0641* (2013.01);
(Continued)

(58) Field of Classification Search
CPC ................ C04B 35/48; C04B 16/0641; C04B 16/065; C04B 2235/3206; C04B 2235/3225;
(Continued)

(56) References Cited

U.S. PATENT DOCUMENTS

2013/0221554 A1 *  8/2013  Jung ..................... A61C 13/083
                                                            264/16
2019/0231494 A1 *  8/2019  Dittmann ............ C04B 38/0074
2019/0380815 A1 * 12/2019  Aiba ....................... B32B 18/00

FOREIGN PATENT DOCUMENTS

EP      3567017       11/2019
JP      2014-218389   11/2014
JP      2016-527017    9/2016

OTHER PUBLICATIONS

Official Action dated May 25, 2020 in European patent application No. 20160516.9.

* cited by examiner

*Primary Examiner* — Karl E Group
*Assistant Examiner* — Cameron K Miller
(74) *Attorney, Agent, or Firm* — Greenblum & Bernstein, P.L.C.

(57) ABSTRACT

There is provided at least any of a layered body which has a change in color tone and in which it is unnecessary to select a colorant and the content of the colorant in consideration of a difference in the sintering behavior between layers, a precursor thereof, or a method for producing these. Provided is a layered body which has a structure, in which two or more layers containing stabilizer-containing zirconia and a colorant are layered, and in which types and contents of the colorants contained in the layers are equal to each other, the layered body including at least: a first layer containing a colorant and zirconia which has a stabilizer content of higher than or equal to 3.3 mol %; and a second layer containing a colorant and zirconia which has a stabilizer content different from that of the zirconia contained in the first layer.

18 Claims, 2 Drawing Sheets

(52) U.S. Cl.
CPC ............... *C04B 2235/3206* (2013.01); *C04B 2235/3225* (2013.01); *C04B 2235/3229* (2013.01); *C04B 2235/608* (2013.01); *C04B 2235/9653* (2013.01); *C04B 2237/068* (2013.01); *C04B 2237/343* (2013.01); *C04B 2237/348* (2013.01); *C04B 2237/525* (2013.01)

(58) Field of Classification Search
CPC ...... C04B 2235/3229; C04B 2235/608; C04B 2235/9653; C04B 2237/068; C04B 2237/343; C04B 2237/348; C04B 2237/525; C04B 35/486; C04B 35/4885; C04B 35/488
See application file for complete search history.

ZIRCONIA LAYERED BODY

BACKGROUND OF THE INVENTION

Field of the Invention

The present disclosure relates to a composition in which layers of zirconia are layered and to a zirconia layered body.

Description of Related Art

A zirconia ($ZrO_2$) sintered body is produced by molding raw material powder which mainly contains zirconia and sintering the molded raw material powder. The raw material powder thermally shrinks and is densified through heat treatment such as sintering or calcination. The behavior of the raw material powder during heat treatment differs depending on the characteristics of the raw material powder, particularly the composition of the raw material powder.

Even with raw material powder in which there is only a difference in the content of additives of less than 0.1 wt %, in a case where a sintered body in which these raw material powder are layered is heat-treated, sintering behaviors among the layers are different from each other due to the composition difference. In order to obtain a layered body having a change in color tone without causing such failures, special adjustment or treatment is required (for example, Patent Documents 1 and 2).

Patent Document 1 discloses that compositions and thermal shrinkage behaviors of raw material powder are adjusted by coating the raw material powder with a dopant, and the raw material powder are molded to obtain a sintered body consisting of a layered body having different color tones. In addition, Patent Document 2 discloses that a sintered body, which consists of a layered body having a change in color tone and layers having different contents of colorants, is obtained by layering and molding layers by applying vibration so as to form a boundary layer in which powder of upper and lower layers are mixed with each other.

PATENT DOCUMENTS

[Patent Document 1] Published Japanese Translation No. 2016-527017 of the PCT International Publication

[Patent Document 2] Japanese Unexamined Patent Application, First Publication No. 2014-218389

SUMMARY OF THE INVENTION

The change in color tones is imparted to the layered bodies disclosed in Patent Documents 1 and 2 by changing the content of additives between layers. However, in these layered bodies, it is necessary to select a colorant for each layer and the contents thereof in consideration of differences in the sintering behavior between layers which are derived from differences in the contents of the colorants in addition to a desired color tone.

An object of the present disclosure is to provide at least any of a layered body which has a change in color tone and in which it is unnecessary to select a colorant and the content of the colorant in consideration of the difference in the sintering behavior between layers, a precursor thereof, or a method for producing these. From another viewpoint, another object of the present disclosure is to provide at least any of a layered body which is suitable as a dental prosthetic member, a precursor thereof, or a method for producing these.

The present inventors have focused on a state of zirconia, which occupies the majority of a layered body, when producing a layered body having a change in color tone. As a result, it is found that a change in color tone is imparted to the layered body due to a mechanism different than that of a layered body in the related art, by layering raw material powder having different contents of stabilizers of zirconia.

That is, the gist of the present disclosure is as follows.

[1] A layered body which has a structure, in which two or more layers containing stabilizer-containing zirconia and a colorant are layered, and in which types and contents of the colorants contained in the layers are equal to each other, the layered body including at least: a first layer containing a colorant and zirconia which has a stabilizer content of higher than or equal to 3.3 mol %; and a second layer containing a colorant and zirconia which has a stabilizer content different from that of the zirconia contained in the first layer.

[2] The layered body according to [1], in which the content of the stabilizer of the stabilizer-containing zirconia contained in the second layer is 1.5 mol % to 7.0 mol %.

[3] The layered body according to [1] or [2], in which the content of the stabilizer of the stabilizer-containing zirconia contained in the second layer is 4.5 mol % to 7.0 mol %.

[4] The layered body according to any one of [1] to [3], in which the content of the stabilizer of the stabilizer-containing zirconia contained in the first layer is 3.3 mol % to 5.5 mol %.

[5] The layered body according to any one of [1] to [4], in which a difference between the stabilizer content in the first layer and the stabilizer content in the second layer is greater than or equal to 0.2 mol %.

[6] The layered body according to any one of [1] to [5], in which the stabilizer is one or more selected from the group consisting of yttria ($Y_2O_3$), calcia (CaO), magnesia (MgO), ceria ($CeO_2$), praseodymium oxide ($Pr_6O_{11}$), neodymium oxide ($Nd_2O_3$), terbium oxide ($Tb_4O_7$), erbium oxide ($Er_2O_3$), and ytterbium oxide ($Yb_2O_3$).

[7] The layered body according to any one of [1] to [6], in which the colorant is at least any of a transition metal element or a lanthanoid-based rare earth element.

[8] The layered body according to any one of [1] to [7], in which the content of the colorant is 0.01 wt % to 1.0 wt %.

[9] The layered body according to any one of [1] to [8], in which at least one of the layers contains alumina.

[10] The layered body according to any one of [1] to [9], in which a warp measured using a thickness gauge according to JIS B 7524:2008 is less than or equal to 1.0 mm.

[11] The layered body according to any one of [1] to [10], in which a warp measured using a thickness gauge according to JIS B 7524:2008 is less than or equal to 0.2 mm.

[12] The layered body according to any one of [1] to [11], in which the layered body is a sintered body.

[13] The layered body according to any one of [1] to [12], further including: a zirconia layer of which a total light transmittance with respect to a CIE standard light source D65 at a sample thickness of 1.0 mm is 30% to 50%.

[14] The layered body according to any one of [1] to [13], in which the layered body is a calcined body.

[15] A method for producing the layered body according to any one of [1] to [13], including: a step of sintering a green body at 1,200° C. to 1,600° C., wherein the green body has a structure, in which two or more powder composition layers consisting of a powder composition containing a stabilizer-containing zirconia, a colorant, and a binding agent are layered, and in which types and contents of the colorants contained in the powder composition layers are equal to each other, includes at least a first powder composition layer containing a binding agent, a colorant, and zirconia which has a stabilizer content of higher than or equal to 3.3 mol % and a second powder composition layer containing a binding agent, a colorant, and zirconia which has a stabilizer content different from that of the zirconia contained in the first powder composition layer, and has a difference in a binding agent content between the first powder composition layer and the second powder composition layer exceeds 0.01 wt %.

[16] A method for producing the layered body according to any one of [1] to [13], including: a step of calcining a green body at a temperature of higher than or equal to 800° C. and lower than 1,200° C. to obtain a calcined body;

and a step of sintering the calcined body at 1,200° C. to 1,600° C., wherein the green body has a structure, in which two or more powder composition layers consisting of a powder composition containing a stabilizer-containing zirconia, a colorant, and a binding agent are layered, and in which types and contents of the colorants contained in the powder composition layers are equal to each other, includes at least a first powder composition layer containing a binding agent, a colorant, and zirconia which has a stabilizer content of higher than or equal to 3.3 mol % and a second powder composition layer containing a binding agent, a colorant, and zirconia which has a stabilizer content different from that of the zirconia contained in the first powder composition layer, and has a difference in a binding agent content between the first powder composition layer and the second powder composition layer exceeds 0.01 wt %.

[17] A method for producing the layered body according to any one of [1] to [11] and [14], including: a step of calcining a green body at a temperature of higher than or equal to 800° C. and lower than 1,200° C., wherein the green body which has a structure, in which two or more powder composition layers consisting of a powder composition containing a stabilizer-containing zirconia, a colorant, and a binding agent are layered, and in which types and contents of the colorants contained in the powder composition layers are equal to each other, includes at least a first powder composition layer containing a binding agent, a colorant, and zirconia which has a stabilizer content of higher than or equal to 3.3 mol % and a second powder composition layer containing a binding agent, a colorant, and zirconia which has a stabilizer content different from that of the zirconia contained in the first powder composition layer, and has a difference in a binding agent content between the first powder composition layer and the second powder composition layer exceeds 0.01 wt %.

[18] The production method according to any one of [15] to [17], in which the binding agent is one or more selected from the group consisting of polyvinyl alcohol, polyvinyl butyrate, wax, and acrylic resin.

[19] The production method according to any one of [15] to [18], in which the powder composition contained in the powder composition layers is granulated powder.

[20] A dental material containing the layered body according to any one of [1] to [12].

According to the present disclosure, it is possible to provide any of a layered body which has a change in color tone and in which it is unnecessary to select a colorant and the content of the colorant in consideration of the difference in the sintering behavior between layers, a precursor thereof, or a method for producing these. Furthermore, it is possible to provide at least any of a layered body which is suitable as a dental prosthetic member, a precursor thereof, or a method for producing these.

DETAILED DESCRIPTION OF THE INVENTION

A layered body of the present embodiment may be one or more selected from the group consisting of a sintered body, a calcined body, and a green body, and is preferably at least any of a sintered body or a calcined body. Here, in the present embodiment, a "layer containing stabilizer-containing zirconia and a colorant" may be regarded as a "zirconia layer containing stabilizer-containing zirconia and a colorant" in a case where the layered body is a sintered body, a "zirconia composition layer containing a colorant and zirconia which contains a stabilizer and has a necking structure" in a case where the layered body is a calcined body, and a "powder composition layer consisting of a powder composition containing stabilizer-containing zirconia, a colorant, and a binding agent" in a case where the layered body is a green body.

Hereinafter, the layered body of the present disclosure will be described with reference to an example of an embodiment in which the layered body is a sintered body.

In the present embodiment, the layered body is a sintered body which has a structure, in which two or more zirconia layers containing stabilizer-containing zirconia and a colorant are layered, and in which types and contents of the colorants contained in the zirconia layers are equal to each other, and includes at least: a first zirconia layer containing a colorant and zirconia which has a stabilizer content of higher than or equal to 3.3 mol %; and a second zirconia layer containing a colorant and zirconia having a stabilizer content different from that of the zirconia contained in the first zirconia layer.

The sintered body of the present embodiment is a so-called layered body which is a composition having a multilayer structure, and is a layered body consisting of a sintered structure. In the present embodiment, the sintered structure is a structure mainly made of zirconia in a later stage of sintering.

The sintered body of the present embodiment has a zirconia layer (hereinafter, also simply referred to as a "zirconia layer") which contains stabilizer-containing zirconia and a colorant. The zirconia layer mainly consists of crystal grains of zirconia containing a stabilizer. Accordingly, the sintered body of the present embodiment can also be regarded as a layered body including two or more layers containing a colorant and zirconia consisting of zirconia crystal grains containing a stabilizer.

Figure 1:
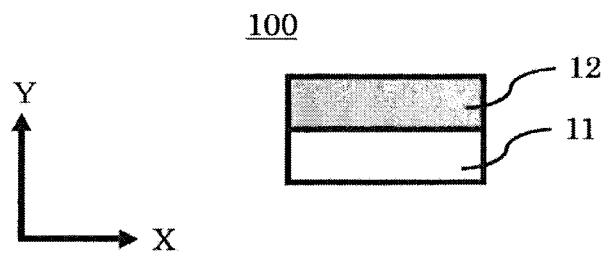
FIG. 1 is a schematic diagram showing a cross section of a sintered body having a structure in which two zirconia layers are layered.

FIG. 1 is a schematic diagram which shows an example of a structure of the sintered body of the present embodiment and schematically shows a cross section of a sintered body (100) having a structure in which two zirconia layers containing stabilizer-containing zirconia and a colorant are layered. In FIG. 1, a direction (hereinafter, also referred to as a "layering direction") in which layers are piled up is indicated as a Y-axis direction, and a direction (hereinafter, also referred to as a "horizontal direction") in which each layer spreads is indicated as an X-axis direction.

The sintered body (100) includes zirconia layers which are a first zirconia layer (hereinafter, also referred to as a "first layer") (11) containing a colorant and zirconia having a stabilizer content of greater than or equal to 3.3 mol % and a second zirconia layer (hereinafter, also referred to as a "second layer") (12) containing a colorant and zirconia having a stabilizer content different from that of the zirconia contained in the first zirconia layer. The sintered body (100) is shown as a sintered body having a structure in which the first layer (11) and the second layer (12) are layered adjacent to each other. In the case where the sintered body has a structure in which zirconia layers containing zirconia having different stabilizer contents are layered, the sintered body becomes a layered body in which the change in color tone based on synergistic effects such as translucency or the difference in the stabilizer content can be visually recognized. A state in which the first layer comes into contact with the second layer via an interface is shown in the sintered body (100). However, the layers of the sintered body of the present embodiment may be layered in a state in which there is no visually recognizable interface, and the interface between layers is not limited to being linear.

In the sintered body (100), the first layer and the second layer have substantially the same thickness. However, in the sintered body of the present embodiment, each layer may have a different thickness (hereinafter, also referred to as a "layer thickness"), and the layer thickness of either the first layer or the second layer may be thicker. For example, the layer thicknesses of the first layer and the second layer may satisfy the following relation, and the layer thickness of a zirconia layer having a high stabilizer content is thicker than that of a zirconia layer having a low stabilizer content. Examples of the layer thickness include 1 mm to 20 mm, 2 mm to 15 mm, and 3 mm to 10 mm.

$$D_{high} \geq D_{low}, \text{ preferably } 2 \times D_{low} \geq D_{high} \geq D_{low}$$

where $D_{high}$ is a layer thickness of a zirconia layer having a high stabilizer content, and $D_{low}$ is a layer thickness of a zirconia layer having a low stabilizer content.

The shape of the sintered body of the present embodiment is arbitrary, and may be at least one selected from the group consisting of a spherical shape, an elliptical shape, a disk shape, a cylindrical shape, a cubic shape, a rectangular parallelepiped shape, and a polyhedral shape, or may be a shape suitable for dental materials including dental prosthetic materials such as a crown, a bridge, and an onlay, or an arbitrary shape according to other intended uses. In the present embodiment, the spherical shape may include a shape similar to a true sphere such as a substantially spherical shape in addition to a true sphere, and a polyhedral shape may include a shape similar to a polyhedron such as a substantially polyhedral shape in addition to a polyhedron.

The dimensions of the sintered body of the present embodiment are arbitrary, and examples thereof include 10 mm to 120 mm in length, 12 mm to 120 mm in width, and 6 mm to 40 mm in height. In addition, the thickness of the sintered body of the present embodiment in the layering direction, that is, the height of the sintered body is arbitrary, and examples thereof include 4 mm to 40 mm and 5 mm to 30 mm.

The sintered body of the present embodiment is preferably in a state in which the first layer and the second layer are layered adjacent to each other. In addition, the first layer and the second layer are each preferably positioned as a lowest layer (hereinafter, also referred to as a "lowermost layer") in the layering direction or at a topmost layer (hereinafter, also referred to as an "uppermost layer") in the layering direction. It is preferable that one of the first layer and the second layer be positioned as a lowermost layer and the other one of the first layer and the second layer be positioned as an uppermost layer.

The sintered body of the present embodiment may have a structure in which two or more zirconia layers containing stabilizer-containing zirconia and a colorant are layered, or may have a structure in which three or more zirconia layers, or four or more zirconia layers are layered. The sintered body becomes a layered body in which a small change in texture can be visually recognized according to increase in the number of layers. In a case where the same texture as that of natural teeth is required, the sintered body of the present embodiment may have a structure in which 2 to 10 zirconia layers, 2 to 5 zirconia layers, or 2 to 4 zirconia layers are layered, for example.

A zirconia layer (hereinafter, also referred to as an "optional layer") other than the first layer and the second layer may be a zirconia layer containing a colorant and zirconia having a stabilizer content of higher than or equal to a minimum value and lower than or equal to a maximum value of the contents of the stabilizers of zirconia contained in the first layer and the second layer. The sintered body of the present embodiment may contain a plurality of optional layers.

Although the layering order of the optional layers is arbitrary, a structure is preferable in which an optional layer is interposed between the first layer and the second layer. In the case where the sintered body of the present embodiment includes a plurality of optional layers (an optional layer in a first layer is also referred to as a third layer", optional layers in a second or higher layers are also referred to as a "fourth layer", a "fifth layer", and the like), the sintered body preferably has a structure in which the zirconia layers are layered so that the change in the contents of the stabilizers in the layering direction becomes constant, that is, the change increases (or decreases). The structure in which the optional layers are interposed between the first layer and the second layer in the present embodiment is a structure in which the optional layer is positioned between the first layer and the second layer in the layering direction, and is not limited to a structure in which the optional layers are layered directly adjacent to both the first layer and the second layer. In addition, the ordinal numbers such as first, second, and third in the present embodiment are numbers given for convenience of description, and do not mean a layered state or a permutation such as a layering order.

Figure 2:
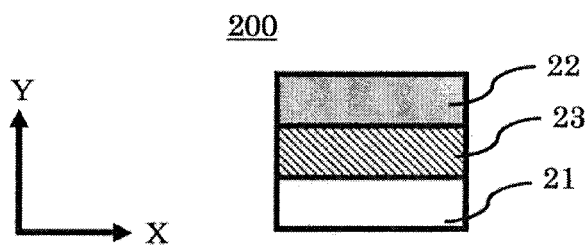
FIG. 2 is a schematic diagram showing a cross section of a sintered body having a structure in which three zirconia layers are layered.

FIG. 2 is a schematic diagram which shows another example of a structure of the sintered body of the present embodiment and shows a cross section of a sintered body (200) having a structure in which three zirconia layers are layered. The sintered body (200) has a structure in which a third layer (23) is layered in addition to a first layer (21) and a second layer (22) and the third layer (23) is interposed between the first layer (21) and the second layer (22).

In a case where the sintered body includes a plurality of zirconia layers such as the fourth layer and the fifth layer, the sintered body preferably has a structure in which the zirconia layers are layered so that the contents of stabilizers change constantly in the layering direction. Accordingly, gradations of color tones are formed based on synergistic effects such as the translucency or the difference in the stabilizer content.

In the sintered body of the present embodiment, a warp (hereinafter, also simply referred to as a "warp") measured using a thickness gauge according to JIS B 7524:2008 is less than or equal to 1.0 mm. A sintered body having a structure with two or more zirconia layers has a shape warped in the layering direction (or a direction opposite to the layering direction) through sintering. In a case where such a sintered body is disposed on a horizontal plate, a gap is formed between the sintered body and the horizontal plate.

The warp in the present embodiment is a value measured using a thickness gauge (hereinafter, also simply referred to as a "gauge") according to JIS B 7524:2008. The warp of the sintered body of the present embodiment is preferably less than or equal to 0.3 mm, more preferably less than or equal to 0.2 mm, still more preferably less than or equal to 0.1 mm, and still more preferably less than or equal to 0.05 mm. The sintered body preferably does not have a warp (warp of 0 mm), but the sintered body of the present embodiment may have a warp (warp of greater than or equal to 0 mm) to a degree that cannot be measured by a gauge. The sintered body of the present embodiment has, for example, a warp greater than 0 mm, or greater than or equal to 0.01 mm. It is preferable that the warp be less than or equal to 0.06 mm, less than or equal to 0.05 mm, or less than or equal to a measurement limit (less than 0.03 mm).

Figure 3:
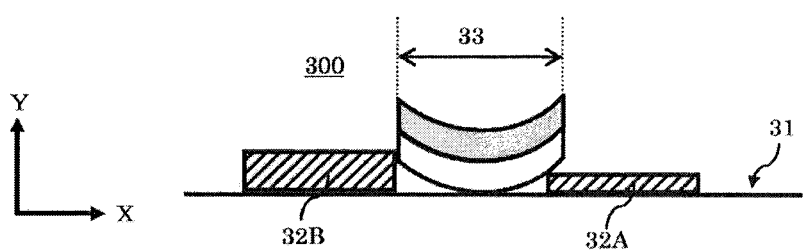
FIG. 3 is a schematic diagram showing a method for measuring a warp.

The warp can be measured using a maximum value of the thickness of a gauge that can be inserted into a gap formed in a state in which a sintered body is disposed so that a convex portion of the sintered body comes into contact with a horizontal plate. FIG. 3 is a schematic diagram showing a method for measuring a warp. A sintered body (300) shows a cross section of a disk-shaped sample and shows a sintered body warped in the layering direction (Y-axis direction). In FIG. 3, the warp of the sintered body (300) is emphasized for description. When measuring the warp, the sintered body (300) with a concave-convex shape is disposed so that the convex portion of the sintered body comes into contact with a horizontal plate (31) as shown in FIG. 3. Accordingly, a gap is formed between the horizontal plate (31) and a surface (hereinafter, also referred to as a "bottom surface") on which the sintered body (300) comes into contact with the horizontal plate (31). The warp can be measured by inserting a gauge into the gap and using a maximum value of the thickness of the gauge that can be inserted. FIG. 3 shows a state in which a gauge (32A) is positioned under the bottom surface of the sintered body (300) and can be inserted into the gap. On the other hand, FIG. 3 shows a state in which a gauge (32B) is not positioned under the bottom surface of the sintered body (300) and cannot be inserted into the gap. The gauges (32A) and (32B) in FIG. 3 are gauges having different thicknesses by one step (for example, 0.01 mm), and the warp of the sintered body (300) becomes the thickness of the gauge (32A). In order to simplify the description, FIG. 3 shows a diagram in which both the gauges (32A) and (32B) are inserted into the gap. However, the warp may be measured by inserting gauges sequentially from a thin gauge (for example, the warp is measured using the gauge (32A) which is then removed, and the warp is subsequently measured using the thicker gauge (32B)).

In the sintered body of the present embodiment, the warp (hereinafter, also referred to as a "deformation amount") with respect to the dimension of the sintered body is preferably less than or equal to 1.0, more preferably less than or equal to 0.5, still more preferably less than or equal to 0.2, and still more preferably less than or equal to 0.15. The deformation amount is, for example, greater than or equal to 0, greater than or equal to 0.01, or greater than or equal to 0.05.

The deformation amount can be obtained from the following equation.

$$\text{Deformation amount} = (\text{warp: mm})/(\text{dimension of sintered body: mm}) \times 100$$

The dimension of the sintered body is a size of the sintered body in a direction perpendicular to the direction of the warp. The sintered body (300) of FIG. 3 is formed along the layering direction (Y-axis direction). Therefore, the dimension of the sintered body (300) is a size (33) of the sintered body in the horizontal direction (X-axis direction) perpendicular to the layering direction. The dimension can be measured through a well-known measurement method using calipers, a micrometer, and the like. For example, in a case of a disk-shaped or cylindrical layered body, diameters of upper ends and diameters of lower ends at four points are measured using calipers, and an average value of the diameters of the upper ends and the lower ends is obtained to obtain the dimension of the layered body using the average value of the obtained values.

In the present embodiment, the warp and the deformation amount are preferably values measured using a disk-shaped sample as a measurement sample and more preferably values measured using a disk-shaped sample having a diameter of 5 mm to 120 mm as a measurement sample.

The sintered body of the present embodiment consists of zirconia layers containing a colorant and zirconia containing a stabilizer. The zirconia layer is a layer containing zirconia as a main component, and the zirconia is zirconia (hereinafter, also referred to as "stabilizer-containing zirconia") containing a stabilizer. The sintered body and the zirconia layer of the present embodiment may contain not only a colorant and stabilizer-containing zirconia but also unavoidable impurities such as hafnia ($HfO_2$).

In the sintered body of the present embodiment, the zirconia is preferably zirconia in a state in which zirconia obtained by subjecting a zirconia sol to a heat treatment is sintered, more preferably zirconia in a state in which zirconia obtained by subjecting a zirconia sol obtained by hydrolyzing a zirconium compound to a heat treatment is sintered, and still more preferably zirconia in a state in which zirconia obtained by subjecting a zirconia sol obtained by hydrolyzing zirconium oxychloride to a heat treatment is sintered.

Examples of zirconia contained in a zirconia layer include sintered zirconia, that is, zirconia crystal grains.

A stabilizer may have a function of suppressing phase transition of zirconia. Examples of the stabilizer include at least any of a stabilizer (hereinafter, also referred to as a "non-coloring stabilizer") which has a function of suppressing phase transition but does not contain an element having a function of coloring zirconia, or a stabilizer (hereinafter, also referred to as a "coloring stabilizer") which has functions of suppressing phase transition and coloring zirconia. The stabilizer may be a non-coloring stabilizer or a coloring stabilizer, and preferably includes at least a non-coloring stabilizer.

Specific examples of the stabilizer include one or more selected from the group consisting of yttria ($Y_2O_3$), calcia (CaO), magnesia (MgO), ceria (CeO$_2$), praseodymium oxide (Pr$_6$O$_{11}$), neodymium oxide (Nd$_2$O$_3$), terbium oxide (Tb$_4$O$_7$), erbium oxide (Er$_2$O$_3$), and ytterbium oxide (Yb$_2$O$_3$).

Examples of the non-coloring stabilizer include one or more selected from the group consisting of yttria, calcia, magnesia, and ceria. At least any of yttria or ceria is preferable and yttria is more preferable.

Examples of the coloring stabilizer include one or more selected from the group consisting of praseodymium oxide, neodymium oxide, terbium oxide (terbia), erbium oxide (erbia), and ytterbium oxide, and at least any of terbium oxide or erbium oxide is preferable.

The stabilizer is in a state of being contained and doped (solid-soluted) in zirconia. In addition, the sintered body of the present embodiment preferably does not contain an undoped stabilizer, that is, a stabilizer not doped in zirconia. In the present embodiment, the expression "not containing an undoped stabilizer" means that no XRD peaks derived from a stabilizer can be confirmed in XRD measurement and XRD pattern analysis to be described below. Incorporation of an undoped stabilizer is acceptable as long as no XRD peak derived from the stabilizer can be confirmed.

The stabilizer content (hereinafter, also referred to as a "stabilizer content of the first layer") of the stabilizer-containing zirconia contained in the first layer is higher than or equal to 3.3 mol %, preferably higher than or equal to 3.5 mol %, more preferably higher than or equal to 3.7 mol %, still more preferably higher than or equal to 4 mol %, still more preferably higher than or equal to 4.1 mol %, and still more preferably higher than or equal to 4.2 mol %. The stabilizer content of the first layer is, for example, lower than or equal to 6.0 mol %, lower than or equal to 5.8 mol %, lower than or equal to 5.5 mol %, or lower than or equal to 5.0 mol %. The stabilizer content of the first layer is, for example, 3.3 mol % to 6.0 mol %, 3.5 mol % to 5.0 mol %, 4 mol % to 6.0 mol %, and higher than or equal to 4 mol % and lower than 5.0 mol %.

The content (hereinafter, also referred to as a "stabilizer content of a second layer") of a stabilizer of stabilizer-containing zirconia contained in a second layer may be different from the stabilizer content of the first layer, but is preferably higher than that of the first layer. That is, the sintered body of the present embodiment preferably does not contain a zirconia layer in which the content of a stabilizer of zirconia is lower than 3.3 mol %. Accordingly, a sintered body exhibiting a color tone closer to that of natural teeth is easily obtained.

The stabilizer content of the second layer may be higher than or equal to 1.5 mol %, higher than or equal to 2.0 mol %, or higher than or equal to 3.0 mol %, and is preferably higher than or equal to 4.0 mol %, more preferably higher than 4.0 mol %, still more preferably higher than or equal to 4.5 mol %, still more preferably higher than or equal to 5.0 mol %, and still more preferably higher than 5.0 mol %. In addition, the stabilizer content of the second layer is, for example, lower than or equal to 7.0 mol %, lower than or equal to 6.5 mol %, lower than or equal to 6.0 mol %, or lower than or equal to 5.8 mol %. In the case where the first layer and the second layer have different contents of stabilizers and the stabilizer contents of both the layers are within these ranges, the sintered body is likely to exhibit a texture that can be visually recognized as a texture close to that of natural teeth. The stabilizer content of the second layer is, for example, 1.5 mol % to 7.0 mol %, 3.0 mol % to 6.5 mol %, 3.9 mol % to 6.5 mol %, 4.5 mol % to 6.5 mol %, 5.0 mol % to 6.5 mol %, or higher than 5.0 mol % and lower than or equal to 6.0 mol %.

The sintered body of the present embodiment preferably includes at least a first zirconia layer and a zirconia layer containing zirconia having a stabilizer content of higher than or equal to 4.5 mol % or higher than or equal to 5 mol % and more preferably includes a first zirconia layer and a zirconia layer containing zirconia having a stabilizer content of higher than 5 mol %. As another embodiment, the sintered body of the present embodiment more preferably has a stabilizer content of a first layer of 4.0 mol % to 5.1 mol % and a stabilizer content of a second layer of 4.5 mol % to 6.0 mol %. Furthermore, the sintered body of the present embodiment still more preferably has a stabilizer content of a first layer of 3.3 mol % to 4.5 mol % and a stabilizer content of a second layer of higher than 4.5 mol % and lower than or equal to 5.8 mol %, and still more preferably has a stabilizer content of a first layer of 3.8 mol % to 4.3 mol % and a stabilizer content of a second layer of 4.7 mol % to 5.5 mol %.

The content (hereinafter, also referred to as a "stabilizer content of an optional layer") of a stabilizer of stabilizer-containing zirconia contained in an optional layer is higher than or equal to a minimum value and lower than or equal to a maximum value of the contents of the stabilizers of the zirconia contained in the first layer and the second layer, and is preferably higher than a minimum value and lower than a maximum value of the contents of the stabilizers of the zirconia contained in the first layer and the second layer. The stabilizer content of the third layer is, for example, 1.5 mol % to 7.0 mol %, 3.0 mol % to 6.5 mol %, or 4.0 mol % to 6.0 mol %. In a case where the content of the stabilizer of the zirconia contained in the first layer is 4.0 mol % and the content of the stabilizer of the zirconia contained in the second layer is 6.0 mol %, the content of the stabilizer of the zirconia of the optional layer is, for example, 4.0 mol % to 6.0 mol % and preferably higher than 4.0 mol % and less than 6.0 mol %. In a case where the stabilizer content of the optional layer is the same as that of the first layer or the second layer, a zirconia layer which has the same stabilizer content as the optional layer and is positioned as the uppermost layer or the lowermost layer may be regarded as the first layer or the second layer.

The difference between the stabilizer content of the first layer and the stabilizer content of the second layer is preferably greater than or equal to 0.2 mol %, more preferably greater than or equal to 0.5 mol %, still more preferably greater than or equal to 0.7 mol %, still more preferably greater than or equal to 1.0 mol %, and still more preferably greater than or equal to 1.2 mol %. As the difference in the stabilizer content increases, the difference in color tone between the zirconia layers tends to increase, and in contrast, the warp sometimes increases. In a case where the difference between the stabilizer content of the first layer and the stabilizer content of the second layer is less than 2.5 mol %, or less than or equal to 2.0 mol %, or less than or equal to 1.7 mol %, the sintered body is tended to have the same change in color tone as that of natural teeth. It is more preferable that the difference between the stabilizer content of the first layer and the stabilizer content of the second layer be greater than or equal to 0.7 mol % and less than 2.5 mol % and the warp be less than or equal to 0.5 mm.

The sintered body of the present embodiment preferably has a structure in which the difference in the stabilizer content between zirconia layers layered adjacent to each other is 0.5 mol % to 3.0 mol %, 1.0 mol % to 2.5 mol %, or 1.2 mol % to 2.0 mol %.

The stabilizer content (stabilizer content as the entirety of the sintered body) of the sintered body of the present embodiment is arbitrary, but examples thereof include higher than 1.5 mol % and lower than 7.0 mol %, 2.5 mol % to 6.5 mol %, 3.0 mol % to 6.0 mol %, or 3.5 mol % to 5.8 mol %, and is preferably 4.1 mol % to 5.5 mol % more preferably 4.2 mol % to 5.0 mol %, and still more preferably 4.2 mol % to 4.8 mol %. The stabilizer content of a sintered body is obtained from the following expression and varies depending on the thickness of each zirconia layer.

Stabilizer content of sintered body=(layer thickness of first layer/height of sintered body)×stabilizer content of first layer+(layer thickness of second layer/height of sintered body)×stabilizer content of second layer+ . . . +(layer thickness of $n$-th layer/height of sintered body)×stabilizer content of $n$-th layer The stabilizer content of a first layer is higher than or equal to 3.3 mol %. Therefore, in a case where the stabilizer content of a second layer is, for example, higher than 3.3 mol %, the stabilizer content of a sintered body including two zirconia layers having the same layer thickness exceeds 3.3 mol %.

In the sintered body of the present embodiment, it is preferable that the stabilizer content of a first layer be 3.3 mol % to 5.0 mol %, the stabilizer content of a second layer be 4.6 mol % to 6.0 mol %, and the difference between the stabilizer content of the first layer and the stabilizer content of the second layer be 0.7 mol % to 1.8 mol %, and it is more preferable that the yttria content of a first layer be 3.8 mol % to 4.5 mol %, the yttria content of a second layer be higher than 5.0 mol % and lower than or equal to 5.5 mol %, and the difference between the yttria content of the first layer and the yttria content of the second layer be 1.0 mol % to 1.6 mol %.

The stabilizer content in the present embodiment is a molar ratio of a stabilizer to the total amount of zirconia and the stabilizer. When calculating the stabilizer content, the content of each stabilizer may be obtained in terms of an oxide as described above. In a case where, for example, yttria and erbia are contained as stabilizers, the stabilizer content (mol %) is obtained from $(Y_2O_3+Er_2O_3)/(ZrO_2+Y_2O_3+Er_2O_3)\times 100$.

The colorant in the present embodiment is an element having a function of coloring zirconia. Specific examples of the colorant include at least any of a transition metal element and a lanthanoid-based rare earth element, and are preferably one or more selected from the group consisting of iron (Fe), cobalt (Co), nickel (Ni), manganese (Mn), praseodymium (Pr), neodymium (Nd), europium (Eu), gadolinium (Gd), terbium (Tb), erbium (Er), and ytterbium (Yb), more preferably one or more selected from the group consisting of iron, cobalt, manganese, praseodymium, gadolinium, terbium, and erbium, and still more preferably one or more selected from the group consisting of iron, cobalt, terbium, and erbium.

The colorant contained in the sintered body of the present embodiment may be at least any of a colorant (hereinafter, also referred to as an "oxide colorant") contained in a state of oxide or a colorant, such as a coloring stabilizer, contained in a state of being doped in zirconia. Examples of preferred oxide colorants include one or more selected from the group consisting of iron, cobalt, nickel, and manganese, and at least any of iron or cobalt is more preferable. The sintered body of the present embodiment may contain two or more colorants, or may contain, for example, two to five types of colorants or three to four types of colorants. The sintered body of the present embodiment preferably contains at least a coloring stabilizer, more preferably contains at least any of terbium or erbium, and still more preferably contains at least terbium and erbium.

The types and the contents of colorants contained in zirconia layers are equal to each other. For this reason, it is unnecessary to change the content of a colorant in each layer when producing a sintered body. In addition, since the types of colorants contained therein are equal to each other, natural color tone changes such as gradations of similar colors can be obtained by the sintered body. The "contents of colorants being equal" in the present embodiment means that the contents of colorants between layers are equal to each other to a degree that the effect of the layered body of the present embodiment can be exhibited. A difference in the colorant content is acceptable which imparts a change in color tone to a sintered body but does not cause a difference in a sintering behavior derived from the difference in the colorant content between layers in a process of producing the layered body.

The colorant content of the sintered body of the present embodiment is, as a mass ratio of a colorant in terms of an oxide with respect to the mass of the sintered body of the present embodiment, higher than 0 wt % and lower than or equal to 1.5 wt %, preferably 0.01 wt % to 1.0 wt %, more preferably 0.03 wt % to 0.8 wt %, and still more preferably 0.04 wt % to 0.3 wt %. For example, in a case where yttria (non-coloring stabilizer) and erbia (coloring stabilizer) are contained as stabilizers, and alumina and cobalt (oxide colorant) are contained, the content (wt %) of the colorant is obtained from $(Co_3O_4+Er_2O_3)/(ZrO_2+Y_2O_3+Er_2O_3+Co_3O_4+Al_2O_3)\times 100$. In terms of an oxide of the colorant, praseodymium oxide may be $Pr_6O_{11}$, neodymium oxide may be $Nd_2O_3$, terbium oxide may be $Tb_4O_7$, erbium oxide may be $Er_2O_3$, and ytterbium oxide may be $Yb_2O_3$, iron may be $Fe_2O_3$, cobalt may be $Co_3O_4$, nickel may be NiO, and manganese may be $Mn_3O_4$.

Each zirconia layer has an equal colorant content. For this reason, the content of a colorant contained in each zirconia layer, that is the mass ratio of a colorant contained in each zirconia layer in terms of an oxide with respect to the mass of each zirconia layer becomes equal to the colorant content of the above-described sintered body.

The sintered body of the present embodiment may contain alumina, and at least one zirconia layer preferably contains zirconia. The alumina content of the sintered body of the present embodiment may be, as a ratio of the weight of alumina to the weight of the sintered body, for example, higher than or equal to 0 wt %, 0 wt % to 0.15 wt %, 0 wt % to 0.10 wt %, or 0 wt % to 0.07 wt %. In the case where alumina is contained, the alumina content is, for example, higher than 0 wt % and lower than or equal to 0.15 wt %, preferably 0.005 wt % to 0.10 wt %, and more preferably 0.01 wt % to 0.70 wt %.

The alumina content of each zirconia layer is, for example, within the same range as described above. In some cases, the alumina content of each zirconia layer affects a thermal shrinkage behavior in a calcination stage. The alumina content of each zirconia layer is arbitrary. Each zirconia layer may have a different alumina content, but they preferably have the same alumina content. In the case where zirconia layers have a different alumina content, the difference in the alumina content of adjacent zirconia layers is, for example, higher than 0 wt % and lower than or equal to 1.0 wt %, greater than 0 wt % and lower than or equal to 0.5 wt %, greater than 0 wt % and lower than or equal to 0.03 wt %, or 0.005 wt % to 0.01 wt %. In a case of a zirconia layer made of zirconia which contains alumina ($Al_2O_3$) and of which a non-coloring stabilizer is yttria ($Y_2O_3$) and a coloring stabilizer is erbia ($Er_2O_3$), the alumina content can be obtained by $\{Al_2O_3/(ZrO_2+Y_2O_3+Er_2O_3+Al_2O_3)\} \times 100$ (wt %).

It is preferable that the sintered body of the present embodiment do not substantially contain any of silica ($SiO_2$) or titania ($TiO_2$).

The sintered body of the present embodiment preferably contains a zirconia layer containing zirconia of which a crystal phase is at least one of a tetragonal crystal (T phase) or a cubic crystal (C phase), more preferably contains zirconia layer containing zirconia having at least a tetragonal crystal as a main phase, and still more preferably contains a zirconia layer containing zirconia having a tetragonal crystal as a main phase and a zirconia layer containing zirconia having a cubic crystal as a main phase. The "main phase" in the present embodiment means a crystal phase having a largest existence proportion (proportion of an integrated intensity of a peak) in crystal phases of zirconia. The abundance ratio can be obtained from an XRD pattern of the surface of the sintered body.

The following conditions can be exemplified as conditions for measuring the XRD pattern of the surface of the sintered body.

Source: CuK α-rays (λ=1.541862 Å)
Measurement mode: step and scan
Scan condition: 0.000278° per second
Measurement range: 2θ=10-140°
Irradiation width: constant (10 mm)

The obtained XRD pattern is subjected to Rietveld analysis, and the ratio (proportion of an integrated intensity of a peak) of a tetragonal crystal and a cubic crystal is obtained. The crystal phase with a highest proportion may be regarded as a main phase. The measurement of an XRD pattern and the Rietveld analysis can be performed using a general-purpose powder X-ray diffractometer (for example, X'pert PRO MPD manufactured by Spectris Co., Ltd.) and analysis software (for example, RIETAN-2000).

The density of the sintered body of the present embodiment which is measured through a method according to JIS R 1634 is, for example, 5.7 g/$cm^3$ to 6.3 g/$cm^3$ and preferably 5.9 g/$cm^3$ to 6.1 g/$cm^3$. The density in these ranges is a density which corresponds to a relative density of greater than or equal to 99%, and such density is a density of the sintered body having a practical strength, that is, the dense sintered body.

As color tones of the sintered body of the present embodiment and the zirconia layers, the brightness L* represented by a L*a*b* color system is 60 to 90 and preferably 76.5 to 85, the hue a* is −5 to 15 and preferably −3 to 10, and the hue b* is 0 to 45 and preferably 3 to 35, for example. In the case where the color tone is within these ranges, the sintered body exhibits a color tone similar to that of natural teeth.

Since the sintered body of the present embodiment has a change in color tone, the chroma C* of an uppermost layer is preferably different from that of a lowermost layer. The chroma C* is an index indicating vividness and is obtained by $C^*=\{(a^*)^2+(b^*)^2\}^{0.5}$ in which the hue a* and b* is represented by the L*a*b* color system. An absolute value (ΔC*) of the difference in the chroma C* between the uppermost layer and the lowermost layer is, for example, 0.1 to 15.0, 0.3 to 10.0, 1.0 to 5.0, or 1.5 to 3.0. In the case where ΔC* is within these ranges, the layered body can be visually recognized as one having gradations of vividness close to natural teeth. Similarly, an absolute value (ΔL*) of the difference in the brightness L* between the uppermost layer and the lowermost layer is, for example, 1.0 to 15.0 or 1.5 to 5.0.

The color tones (L*, a*, and b*) and C* can be obtained using values measured through an SCI method using a spectrocolorimeter including a lighting/light-receiving optical system according to geometric conditions c of JIS Z 8722. Examples of the spectrocolorimeter include CM-700d manufactured by Konica Minolta, Inc. Examples of specific measurement conditions of the color tones and C* in a method (so-called black background measurement) for placing a measurement sample on a black plate for the measurement include the following conditions.

Light source: light source D65
View angle: 10°
Measurement method: SCI

The sintered body of the present embodiment preferably contains at least a zirconia layer having translucency. Furthermore, the sintered body of the present embodiment preferably has a zirconia layer having a total light transmittance (hereinafter, also simply referred to as a "total light transmittance") with respect to a CIE standard light source D65 at a sample thickness of 1.0 mm is 30% to 50%, 32% to 45%, or 35% to 42%. In the sintered body of the present embodiment, the wavelength of light to be absorbed differs depending on its coloration. For this reason, the total light transmittance with respect to light, such as the CIE standard light source D65 which contains different wavelengths, is suitable as an index of the translucency.

The difference in the total light transmittance between zirconia layers layered adjacent to each other in the sintered body of the present embodiment is preferably 1% to 10% and more preferably 1.5% to 5%.

The total light transmittance of the sintered body of the present embodiment is preferably 30% to 50%, 32% to 45%, or 35% to 42%. The total light transmittance of the sintered body of the present embodiment may be measured by cutting an arbitrary portion of the sintered body in the horizontal direction and using the cut portion as a measurement sample obtained by processing the cut portion so as to have a sample thickness of 1 mm.

The total light transmittance can be measured through a method according to JIS K 7361 and can be obtained as a transmittance value obtained using a CIE standard light source D65 as incident light and by totaling diffuse transmittance and linear transmittance with respect to the incident light. A sample with a thickness of 1 mm and a surface roughness (Ra) of less than or equal to 0.02 μm is used as a measurement sample and is irradiated with light of a CIE standard light source D65 using a general turbidimeter (a haze meter; for example, NDH2000 manufactured by NIPPON DENSHOKU INDUSTRIES Co., LTD.) The transmittance (diffuse transmittance and linear transmittance) of the sample may be measured by condensing transmitted light using an integrating sphere and may be used as a total light transmittance.

In the sintered body of the present embodiment, a three-point bending strength measured through a method according to JSI R 1601 is preferably greater than or equal to 500 MPa, more preferably greater than or equal to 550 MPa, and still more preferably greater than or equal to 600 MPa. Examples of the three-point bending strength includes less than 1,100 MPa and less than or equal to 1,000 MPa.

Figure 4:
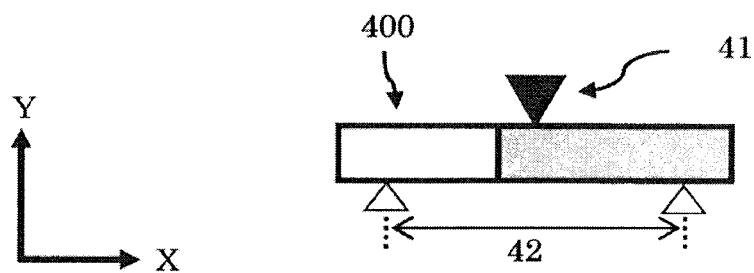
FIG. 4 is a schematic diagram showing a method for measuring a three-point bending strength.

FIG. 4 is a schematic diagram showing a state of measuring a three-point bending strength of a sintered body (400) consisting of two zirconia layers. The sintered body (400) is shown as a sintered body having a structure in which two zirconia layers have different layer thicknesses. In FIG. 4, a layering direction is shown in an X-axis direction and a horizontal direction is shown in a Y-axis direction. A measurement sample to be used for measuring the three-point bending strength is a rectangular parallelepiped sintered body produced while setting the width and the thickness in the layering direction and the length in the horizontal direction. The dimension of the measurement sample is 4 mm in width, 3 mm in thickness, and 45 mm in length. As shown in FIG. 4, the three-point bending strength may be measured by applying a load (41) to the measurement sample (400) so as to be perpendicular to the length of the measurement sample. The measurement sample may be disposed so that the load (41) is applied at the middle of a fulcrum points distance (42). The fulcrum points distance is 30 mm.

Next, main points different from the above-described sintered body will be described with reference to an embodiment in which the layered body is a calcined body.

The calcined body of the present embodiment is a calcined body which has a structure, in which two or more zirconia composition layers containing a colorant and zirconia which contains a stabilizer and has a necking structure, and in which types and contents of the colorants contained in the zirconia composition layers are equal to each other, and includes at least: a first zirconia composition layer containing a colorant and zirconia which has a stabilizer content of higher than or equal to 3.3 mol %; and a second zirconia composition layer containing a colorant and zirconia having a stabilizer content different from that of the zirconia contained in the first zirconia composition layer.

The calcined body is a so-called layered body which is a composition having a multilayer structure, and is a layered body consisting of so-called calcined particles which are structures having a necking structure. The calcined body can be processed as necessary to be used as a precursor of a sintered body, and is also called a pre-sintered body, soft-sintered body or a semi-sintered body.

Figure 5:
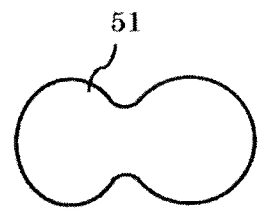
FIG. 5 is a schematic diagram showing zirconia having a necking structure.

The necking structure is a structure of zirconia subjected to a heat treatment at a temperature lower than a sintering temperature, and is a structure in which zirconia particles chemically adhere to each other. As shown in FIG. 5, a part of the particle shape of zirconia (51), which is contained in the zirconia composition layers of the calcined body, in a powder composition can be checked from the zirconia (51). In the present embodiment, the structure having a necking structure is a structure made of zirconia in an initial stage of sintering. This structure having a necking structure is different from the sintered structure, that is, the structure consisting of zirconia crystal grains in a later stage of sintering. Accordingly, the calcined body of the present embodiment can also be regarded as a layered body including two or more layers containing a colorant and zirconia which contains a stabilizer, has a necking structure, and is consisting of zirconia particles.

The calcined body has, instead of zirconia layers, zirconia composition layers (hereinafter, also referred to as "composition layers") containing a colorant and zirconia which contains a stabilizer and has a necking structure, and has the same structure as the layered structure shown in FIG. 1 or 2. The stabilizer and the colorant in the calcined body may be doped in zirconia or may be in a state of an oxide or a precursor thereof.

In the calcined body, a warp is preferably less than or equal to 1.0 mm, more preferably less than or equal to 0.5 mm, still more preferably less than or equal to 0.3 mm, still more preferably less than or equal to 0.2 mm, still more preferably less than or equal to 0.1 mm, and still more preferably less than or equal to 0.05 mm. The calcined body preferably does not have a warp (warp of 0 mm), but may have a warp (warp of greater than or equal to 0 mm) to a degree that cannot be measured by a gauge. The calcined body has, for example, a warp greater than 0 mm, or greater than or equal to 0.01 mm. It is preferable that the warp be less than or equal to 0.06 mm, less than or equal to 0.05 mm, or less than or equal to a measurement limit (less than 0.03 mm). In the calcined body, the deformation amount is preferably less than or equal to 1.0, more preferably less than or equal to 0.5, still more preferably less than or equal to 0.2, and still more preferably less than or equal to 0.15. The deformation amount is, for example, greater than or equal to 0, greater than or equal to 0.01, or greater than or equal to 0.05.

Zirconia contained in the calcined body is preferably in a state in which zirconia obtained by subjecting a zirconia sol to a heat treatment is heat-treated at a temperature lower than a sintering temperature, more preferably in a state in which zirconia obtained by subjecting a zirconia sol obtained by hydrolyzing a zirconium compound to a heat treatment is heat-treated at a temperature lower than a sintering temperature, and still more preferably in a state in which zirconia obtained by subjecting a zirconia sol obtained by hydrolyzing zirconium oxychloride to a heat treatment is heat-treated at a temperature lower than a sintering temperature.

The stabilizer content of stabilizer-containing zirconia contained in a first composition layer (hereinafter, also referred to as a "first composition layer"), the stabilizer content of stabilizer-containing zirconia contained in a second composition layer (hereinafter, also referred to as a "second composition layer"), and the stabilizer content of stabilizer-containing zirconia contained in an optional composition layer (hereinafter, also referred to as an "optional composition layer") may be the same as those of the first layer, the second layer, and the optional layer, respectively.

The stabilizer contents of the calcined body and each composition layer are arbitrary, but may be the same as those of the sintered body of the present embodiment described above.

The calcined body more preferably contains a zirconia composition layer containing zirconia having at least a tetragonal crystal or a cubic crystal as a main phase.

The density of the calcined body is, for example, 2.4 g/cm$^3$ to 3.7 g/cm$^3$ and preferably 3.1 g/cm$^3$ to 3.5 g/cm$^3$. The density in these ranges corresponds to a relative density of 40% to 60%. The calcined body may be a layered body having a strength suitable for processing such as CAD/CAM processing.

The density of the calcined body is obtained from a weight obtained by weight measurement and a volume obtained by dimensional measurement.

The color tones of the zirconia layers contained in the calcined body may be different from those of a sintered body obtained by sintering the calcined body, or may not have a change in color tone.

The calcined body and each composition layer are opaque and have a total light transmittance of 0%. In consideration of a measurement error, the total light transmittance is, for example, 0% to 0.2%.

The calcined body may have such a strength that a defect is less likely to occur during processing such as CAD/CAM or cutting.

The layered body of the present embodiment can be used for well-known zirconia applications such as decorative members, structural materials or optical materials. In the case where the layered body is a sintered body, it can be suitably used as dental materials such as dentures, for example, a crown and a bridge and can be used as dental materials containing the sintered body of the present embodiment. In addition, in the case where the layered body is a calcined body, it can be suitably used as precursors of dental materials such as dentures, for example, a crown and a bridge, and can be used as dental prosthetic materials such as a blank, a disc, a block, and a mill blank, and precursors thereof. Furthermore, the layered body can be provided as dental materials containing the layered body of the present embodiment.

Next, a method for producing a layered body of the present embodiment will be described.

A production method in an aspect in which the layered body of the present embodiment is a sintered body is a method for producing a layered body, the method including: a step of sintering a green body at 1,200° C. to 1,600° C., wherein the green body which has a structure, in which two or more powder composition layers consisting of a powder composition containing a stabilizer-containing zirconia, a colorant, and a binding agent are layered, and in which types and contents of the colorants contained in the powder composition layers are equal to each other, includes at least a first powder composition layer containing a binding agent, a colorant, and zirconia which has a stabilizer content of higher than or equal to 3.3 mol % and a second powder composition layer containing a binding agent, a colorant, and zirconia which has a stabilizer content different from that of the zirconia contained in the first powder composition layer, and has a difference in a binding agent content between the first powder composition layer and the second powder composition layer exceeds 0.01 wt %.

In addition, another production method of the present embodiment is a method for producing a layered body, the method including: a step of calcining a green body at a temperature of is higher than or equal to 800° C. and lower than 1,200° C. to obtain a calcined body;

and a step of sintering the calcined body at 1,200° C. to 1,600° C., wherein the green body which has a structure, in which two or more powder composition layers consisting of a powder composition containing a stabilizer-containing zirconia, a colorant, and a binding agent are layered, and in which types and contents of the colorants contained in the powder composition layers are equal to each other, includes at least a first powder composition layer containing a binding agent, a colorant, and zirconia which has a stabilizer content of higher than or equal to 3.3 mol % and a second powder composition layer containing a binding agent, a colorant, and zirconia which has a stabilizer content different from that of the zirconia contained in the first powder composition layer, and has a difference in a binding agent content between the first powder composition layer and the second powder composition layer exceeds 0.01 wt %.

In addition, still another production method of the present embodiment is a method for producing a layered body, the method including a step of sintering a calcined body at 1,200° C. to 1,600° C. in which the calcined body which has a structure, in which two or more zirconia composition layers containing a colorant and zirconia which contains a stabilizer and has a necking structure, and in which types and contents of the colorants contained in the zirconia composition layers are equal to each other includes at least: a first zirconia composition layer containing a colorant and zirconia which has a stabilizer content of higher than or equal to 3.3 mol %; and a second zirconia composition layer containing a colorant and zirconia having a stabilizer content different from that of the zirconia contained in the first zirconia composition layer.

A production method in an aspect in which the layered body of the present embodiment is a calcined body is a method for producing a layered body, the method including: a step of calcining a green body at a temperature of higher than or equal to 800° C. and lower than 1,200° C., wherein the green body which has a structure, in which two or more powder composition layers consisting of a powder composition containing a stabilizer-containing zirconia, a colorant, and a binding agent are layered, and in which types and contents of the colorants contained in the powder composition layers are equal to each other, includes at least a first powder composition layer containing a binding agent, a colorant, and zirconia which has a stabilizer content of higher than or equal to 3.3 mol % and a second powder composition layer containing a binding agent, a colorant, and zirconia which has a stabilizer content different from that of the zirconia contained in the first powder composition layer, and has a difference in a binding agent content between the first powder composition layer and the second powder composition layer exceeds 0.01 wt %.

The green body used for the production method of the present embodiment is a green body has a structure, in which two or more powder composition layers consisting of a powder composition containing a stabilizer-containing zirconia, a colorant, and a binding agent are layered, and in which types and contents of the colorants contained in the powder composition layers are equal to each other, and includes at least a first powder composition layer containing a binding agent, a colorant, and zirconia which has a stabilizer content of higher than or equal to 3.3 mol % and a second powder composition layer containing a binding agent, a colorant, and zirconia which has a stabilizer content different from that of the zirconia contained in the first powder composition layer, and has a difference in a binding agent content between the first powder composition layer and the second powder composition layer exceeds 0.01 wt %.

It is known that a powder composition containing a binding agent improves the cohesive strength of zirconia and suppresses defects, such as cracks or chips, during molding. In general, it is necessary to make the content of a binding agent in a powder composition which is used for producing a green body uniform in order to make the strength of the obtained green body uniform. On the other hand, it is considered that the binding agent in the green body of the present embodiment not only improves the strength of the green body but also has a function of suppresses a generation of stress between layered layers, by differing the binding agent contents between the layers. Such function is considered as different than a function known in prior art As a result, it is considered that deformation during molding is suppressed and the green body consisting of a layered body in which powder compositions containing zirconia having different stabilizer contents are layered can be heat-treated without causing excessive defects.

Hereinafter, main points of the green body used for the production method of the present embodiment which are different from those of the above-described sintered body will be described.

The green body used for the production method of the present embodiment is a green body has a structure, in which two or more powder composition layers consisting of a powder composition containing a stabilizer-containing zirconia, a colorant, and a binding agent are layered, and in which types and contents of the colorants contained in the powder composition layers are equal to each other, includes at least a first powder composition layer containing a binding agent, a colorant, and zirconia which has a stabilizer content of higher than or equal to 3.3 mol % and a second powder composition layer containing a binding agent, a colorant, and zirconia which has a stabilizer content different from that of the zirconia contained in the first powder composition layer, and has a difference in a binding agent content between the first powder composition layer and the second powder composition layer exceeds 0.01 wt %.

The green body is a so-called layered body which is a composition having a multilayer structure, and is a layered body consisting of a powder composition. The green body can be used as a precursor of a calcined body or a sintered body.

The green body has, instead of zirconia layers, powder composition layers (hereinafter, also referred to as "powder layers") consisting of a powder composition containing stabilizer-containing zirconia, a colorant, and a binding agent, and has the same structure as the layered structure shown in FIG. 1 or 2. Accordingly, the green body can also be regarded as a layered body including two or more layers containing a binding agent and powder of stabilizer-containing zirconia. The stabilizer and the colorant in the green body may be doped in zirconia or may be in a state of an oxide or a precursor thereof. Examples of the precursor include one or more selected from the group consisting of sulfide, chloride, nitrate, sulfate, hydroxide, and oxyhydroxide or one or more selected from the group consisting of chloride, hydroxide, and oxyhydroxide. In addition, the colorant preferably contains at least an oxide.

In the green body, a warp is preferably less than or equal to 1.0 mm, more preferably less than or equal to 0.3 mm, still more preferably less than or equal to 0.2 mm, still more preferably less than or equal to 0.1 mm, and still more preferably less than or equal to 0.05 mm. The green body preferably does not have a warp (warp of 0 mm), but may have a warp (warp of greater than or equal to 0 mm) to a degree that cannot be measured by a gauge. The green body has, for example, a warp greater than 0 mm or greater than or equal to 0.01 mm. It is preferable that the warp be less than or equal to 0.06 mm, less than or equal to 0.05 mm, or less than or equal to a measurement limit (less than 0.03 mm).

In the green body, the deformation amount is preferably less than or equal to 1.0, more preferably less than or equal to 0.5, still more preferably less than or equal to 0.2, and still more preferably less than or equal to 0.15. The deformation amount is, for example, greater than or equal to 0, greater than or equal to 0.01, or greater than or equal to 0.05.

Zirconia contained in the powder layers is preferably zirconia obtained by subjecting a zirconia sol to a heat treatment, more preferably zirconia obtained by subjecting a zirconia sol obtained by hydrolyzing a zirconium compound to a heat treatment, and still more preferably zirconia obtained by subjecting a zirconia sol obtained by hydrolyzing zirconium oxychloride to a heat treatment.

The zirconia contained in the powder layers preferably zirconia powder. The zirconia powder preferably has an average particle size of 0.3 μm to 0.7 μm and 0.4 μm to 0.5 μm.

The colorant contained in the powder layers is preferably in at least any of a state of being mixed with zirconia powder or a state of being doped in zirconia. In addition, colorant powder and zirconia powder may be mixed with each other.

The binding agent contained in the powder layers is preferably a binding agent that vaporizes at a temperature lower than or equal to 1,200° C., more preferably an organic binding agent, and still more preferably an organic binding agent having fluidity at room temperature (for example, 10° C. to 30° C.). In addition, the binding agent may contain a plasticizer or a releasing agent. The organic binding agent is one or more selected from the group consisting of polyvinyl alcohol, polyvinyl butyrate, wax, and an acrylic resin, preferably one or more of polyvinyl alcohol and an acrylic resin, and more preferably an acrylic resin. The acrylic resin in the present embodiment is a polymer containing at least any of an acrylic ester or a methacrylic ester. The acrylic resin contained in a powder composition may be used as a binding agent for ceramics. Specific examples of acrylic resins include one or more selected from the group consisting of polyacrylic acid, polymethacrylic acid, an acrylic acid copolymer, and a methacrylic acid copolymer, and derivatives thereof.

The stabilizer content of stabilizer-containing zirconia contained in a first powder layer, the stabilizer content of stabilizer-containing zirconia contained in a second powder layer, and the stabilizer content of stabilizer-containing zirconia contained in an optional powder layer may be the same as those of the first layer, the second layer, and the optional layer, respectively.

The stabilizer contents and the colorant contents of the green body and each powder layer are arbitrary, but may be the same as those of the sintered body of the present embodiment described above.

From the viewpoint of suppressing defects during molding, the binding agent content of each powder layer is preferably greater than or equal to 1.5 wt %, more preferably 1.5 wt % to 8.0 wt %, still more preferably 2.0 wt % to 6.0 wt %, and still more preferably 2.5 wt % to 5.5 wt %.

In the green body, the difference in the binding agent content (hereinafter, also referred to as a "difference in the amount of the binding agent") between the first powder layer and the second powder layer exceeds 0.01 wt %, and is preferably greater than or equal to 0.03 wt %. In this manner, the first powder layer and the second powder layer of the green body have different binding agent contents. Accordingly, generation of stress during molding is suppressed. From the viewpoint of suppressing the generation of stress, examples of the difference in the amount of the binding agent include greater than 0.01 wt % and less than or equal to 5 wt %, or 0.03 wt % to 3.5 wt %, and are preferably 0.04 wt % to 3 wt %, more preferably 0.05 wt % to 2 wt %, still more preferably 0.06 wt % to 1.5 wt %, and still more preferably 0.07 wt % to 1 wt %. In another embodiment, examples of the difference in the amount of the binding agent include 0.01 wt % to 0.5 wt %, 0.02 wt % to 0.3 wt %, and 0.03 wt % to 0.1 wt %.

The binding agent content is a ratio of the weight of the binding agent to the weight of a powder composition in a powder layer excluding the binding agent ({binding agent/(powder composition−binding agent)}×100). When producing the powder composition, the total mass of components (for example, a stabilizer, zirconia, and alumina in terms of an oxide) of the powder composition other than the binding agent is obtained, and then, the mass ratio of the target binding agent with respect to the obtained total mass is obtained to produce the powder composition, for example.

In order to suppress a warp of the green body, it is preferable to adjust the binding agent content in each powder layer according to the stabilizer contents of adjacent powder layers. Examples of the first powder layer and the second powder layer include any case that the contents of a stabilizer and a binding agent in the second powder layer are higher than those in the first powder layer, the contents of a stabilizer and a binding agent in the second powder layer are lower than those in the first powder layer the content of a stabilizer in the second powder layer is higher than that in the first powder layer and the content of a binding agent in the second powder layer is lower than that in the first powder layer, or the content of a stabilizer in the second powder layer is lower than that in the first powder layer and the content of a binding agent in the second powder layer is higher than that in the first powder layer.

The first powder layer and the second powder layer are preferably any case that the content of a stabilizer in the second powder layer is higher than that in the first powder layer and the content of a binding agent in the second powder layer is lower than that in the first powder layer, or the content of a stabilizer in the second powder layer is lower than that in the first powder layer and the content of a binding agent in the second powder layer is higher than that in the first powder layer. The contents of a stabilizer and a binding agent between the first powder layer and the second powder layer may be different from each other. It is preferable that the difference in the amount of the binding agent be large since this tends to cause suppression of a warp of the green body. In addition, it is preferable that one of the first powder layer and the second powder layer have a lower stabilizer content and a higher binding agent content than the other powder layer.

In addition, it is preferable that one powder layer containing zirconia having a low stabilizer content in powder layers layered adjacent to each other have higher binding agent content than the other powder layer.

On the other hand, in a case where zirconia contained in any one of powder layers layered adjacent to each other is zirconia in which two or more zirconia compounds having different stabilizer contents are mixed with each other, one powder layer containing zirconia having a low stabilizer content preferably has a lower binding agent content than the other powder layer.

From the viewpoint of operability, a powder composition contained in a powder layer is preferably powder (hereinafter, also referred to as "granulated powder") in a state in which zirconia powder, a colorant, and a binding agent are granulated and more preferably granulated powder (hereinafter, also referred to as "powder granules") granulated into granules through spray-drying or the like.

The particle size of granulated powder is arbitrary. Examples of average aggregation sizes include 1 μm to 150 μm, preferably 1 μm to 100 μm, more preferably 5 μm to 50 μm, and still more preferably 5 μm to 30 μm. 20 μm to 50 μm can be exemplified as another embodiment.

The average aggregation size in the present embodiment is a size corresponding to cumulative 50% in volume particle size distribution measurement. The volume particle size distribution is a value that can be measured using a general-purpose device (for example, MT3100II manufactured by MicrotracBEL Corp.) and is a volume size of a particle approximated to a sphere.

The green body more preferably contains a powder layer containing zirconia having at least a tetragonal crystal or a cubic crystal as a main phase.

The density of the green body is, for example, 2.4 g/cm$^3$ to 3.7 g/cm$^3$ and preferably 3.1 g/cm$^3$ to 3.5 g/cm$^3$. The density in these ranges corresponds to a relative density of 40% to 60%.

The density of the green body is obtained from a weight obtained by weight measurement and a volume obtained by dimensional measurement.

The color tones of the zirconia layers contained in the green body may be different from those of a sintered body obtained by sintering the calcined body, or may not have a change in color tone.

The green body and each powder layer are opaque and has a total light transmittance of 0%. In consideration of a measurement error, the total light transmittance is, for example, 0% to 0.2%.

The green body may have such a strength that cracks or chips are not caused when used during calcination or sintering.

The green body is obtained by layering powder compositions and molding the layered powder compositions. Each powder composition is obtained by mixing zirconia powder with a binding agent at an arbitrary desired ratio through a well-known method. The molding is preferably press-molding. For example, a molding die is filled with a powder composition having a composition corresponding to a lowermost layer to obtain the lowermost layer. Thereafter, the molding die is filled with a powder composition having a composition corresponding to a composition of a layer adjacent to the lowermost layer, on the lowermost layer. In a case of obtaining a green body having a structure in which three or more powder layers are layered, the same operation may be repeated to layer necessary powder compositions. After filling the molding die with a powder composition having a composition corresponding to a composition of an uppermost layer, a preliminary green body is obtained by performing uniaxial pressing at an arbitrary pressure. A green body is obtained by subjecting the obtained preliminary green body to cold isostatic pressing (hereinafter, also referred to as "CIP") processing. At the time of layering, it is unnecessary to apply vibration, such as vibration using a vibrator, for forming a mixed layer between layers. In addition, the uniaxial pressing is preferably performed after the filling of the molding die with a powder composition having a composition corresponding to the uppermost layer, and the pressing is preferably not performed before filling the molding die with a powder composition having a composition corresponding to the uppermost layer.

The molding pressure of the uniaxial pressing is preferably 15 MPa to 200 MPa and more preferably 18 MPa to 100 MPa. A warp of a green body tends to be suppressed as the molding pressure of the uniaxial pressing increases. As the pressure of the CIP processing, the molding pressure is, for example, 98 MPa to 392 MPa.

The green body becomes a calcined body by processing the green body at a temperature lower than a sintering temperature. Well-known methods can be used for the calcination method and the calcination conditions.

The holding temperature (hereinafter, also referred to as a "calcination temperature") during calcination is, for example, 800° C. to 1,200° C., preferably 900° C. to 1,150° C., and more preferably 950° C. to 1,100° C.

The holding time (hereinafter, also referred to as "calcination time") at a calcination temperature is preferably 0.5 hours to 5 hours and more preferably 0.5 hours to 3 hours.

The atmosphere (hereinafter, also referred to as a "calcination atmosphere") in the calcination step is preferably an atmosphere other than a reducing atmosphere, more preferably at least any of an oxygen atmosphere or an air atmosphere, and still more preferably an air atmosphere.

In the production method of the present embodiment, any of the green body or the calcined body (hereinafter, these are also collectively referred to as a green body or the like") is processed at a temperature of higher than 1,200° C. to 1,600° C. Accordingly, the green body or the like becomes a sintered body. Prior to sintering, the green body or the like may be processed into an arbitrary shape.

Well-known methods can be used for the sintering method and the sintering conditions. Examples of the sintering method include at least one selected from the group consisting of normal pressure sintering (purssureless sintering), HIP processing, SPS, and vacuum sintering. The sintering method is preferably normal pressure sintering and more preferably normal pressure sintering in an air atmosphere since these are widely used as industrial sintering methods. As the sintering method, it is preferable to perform only normal pressure sintering, and it is more preferable not to perform pressure sintering after normal pressure sintering. Accordingly, it is possible to obtain a sintered body as a normal pressure sintered body. The normal pressure sintering in the present embodiment is a sintering method performed by simply heating an object to be sintered without applying an external force to the object during sintering.

The holding temperature (hereinafter, also referred to as a "sintering temperature") during sintering is, 1,200° C. to 1,600° C., preferably 1,300° C. to 1,580° C., more preferably 1,400° C. to 1,560° C., still more preferably 1,430° C. to 1,560° C., and still more preferably 1,480° C. to 1,560° C. In another embodiment, the sintering temperature is 1,450° C. to 1,650° C., preferably 1,500° C. to 1,650° C., and more preferably 1,550° C. to 1,650° C.

The temperature rising rate up to a sintering temperature is, for example, 50° C./hour to 800° C./hour, preferably 100° C./hour to 800° C./hour, more preferably 150° C./hour to 800° C./hour, still more preferably 150° C./hour to 700° C./hour.

The holding time (hereinafter, also referred to as a "sintering time") at a sintering temperature varies depending on the sintering temperature, and is preferably 1 hour to 5 hours, more preferably 1 hour to 3 hours, and still more preferably 1 hour to 2 hours.

The atmosphere (hereinafter, also referred to as a "sintering atmosphere") of sintering is preferably an atmosphere other than a reducing atmosphere, more preferably at least any of an oxygen atmosphere or an air atmosphere, and still more preferably an air atmosphere. The air atmosphere mainly consists of nitrogen and oxygen, and the oxygen concentration is, for example, about 18 to 23 volume %.

Preferred sintering conditions in a sintering step are, for example, normal pressure sintering in an air atmosphere.

EXAMPLES

Hereinafter, the layered body of the present embodiment will be described using examples. However, the present disclosure is not limited to these examples.
(Warp and Deformation Amount)

A disk-shaped green body, calcined body, or sintered body is used as a measurement sample to obtain each deformation amount from the following equation.

$$\text{Deformation amount} = (\text{warp: mm})/(\text{dimension: mm}) \times 100$$

The measurement of a warp was performed through the measurement method shown in FIG. 3. The measurement sample was disposed so that a convex portion of the measurement sample comes into contact with a horizontal plate. The warp was measured by inserting a thickness gauge (product name: 75A19 manufactured by Nagai Gauge Co., Ltd.) according to JIS B 7524:2008 into a gap formed between the horizontal plate and a bottom surface. The measurement was performed by inserting the gauge disposed parallel to the horizontal plate into the gap formed between the horizontal plate and the bottom surface of the measurement sample and measuring a gauge thickness becoming a maximum thickness of the gauge which was able to be inserted into the gap, and the gauge thickness was regarded as a warp. Warps were measured from gauge thicknesses of 0.03 mm, and measured sequentially with an interval of 0.01 mm by using a single gauge or combining gauges.

For the dimension of the measurement sample, diameters of upper ends and diameters of lower ends were measured at four points using calipers to obtain an average value of the diameters of the upper and lower ends.
(Total Light Transmittance)

The total light transmittance of a sample was measured through a method according to JIS K 7361. The total light transmittance was measured by irradiating a measurement sample with a standard light source D65 and detecting a light flux transmitted through the measurement sample using an integrating sphere. A general haze meter (device name: haze meter NDH2000 manufactured by NIPPON DENSHOKU INDUSTRIES Co., LTD.) was used for the measurement.

A disk-shaped sample was used as the measurement sample. Prior to the measurement, both surfaces of the sample were mirror-polished to obtain a sample thickness of 1 mm and a surface roughness (Ra) of 0.02 μm or less.
(Average Aggregation Size)

The average aggregation size was measured by charging a powder granule sample into a microtrac particle size distribution meter (device name: MT3100II manufactured by MicrotracBEL Corp.) A particle size at which the cumulative volume became 50% was regarded as an average aggregation size.
(Crystal Phase)

The crystal phase of a layered body sample was measured through XRD measurement under the following conditions. A general XRD device (device name: X'pert PRO MPD manufactured by Spectris Co., Ltd.) was used as a measurement device.

Source: CuK α-rays ($\lambda$=1.541862 Å)
Measurement mode: step and scan
Scan condition: 0.000278° per second
Measurement range: 2θ=10-140°

Irradiation width: constant (10 mm)

Rietveld analysis of an obtained XRD pattern was performed using analysis software (RIETAN-2000), and the ratio (proportion of an integrated intensity of a peak) of a tetragonal crystal to a cubic crystal was obtained. The crystal phase with a highest proportion was regarded as a main phase.

(ΔL* and ΔC*)

The color tone was measured using a general spectrocolorimeter (device name: CM-700d manufactured by Konica Minolta, Inc.) The measurement conditions are as follows.

Light source: light source D65
View angle: 10°
Measurement method: SCI.

A disk-shaped sample having a diameter of 20 mm and a thickness of 5.6 mm was used as a sintered body sample in the examples, and a disk-shaped sample having a diameter of 20 mm and a thickness of 2.8 mm was used as a sintered body sample in reference examples. Both surfaces of a sintered body sample were mirror-polished. A measurement sample was disposed on a black plate, both surfaces of the measurement sample after polishing were used as evaluation surfaces, and color tones (L*, a*, and b*) of each surface were measured (black background measurement). An absolute value of the difference in the measured L* of each surface was obtained as ΔL*, and an absolute value of the difference in C* obtained from a* and b* was obtained as ΔC*. A diameter of 10 mm was employed as an effective area for evaluating color tones.

Synthesis Example 1 (Synthesis of Zirconia Powder)

(Zirconia Powder A1)

A hydrated zirconia sol was obtained by subjecting a zirconium oxychloride aqueous solution to a hydrolysis reaction. Yttrium chloride was added to the hydrated zirconia sol so that the yttria concentration became 5.2 mol %, and then, the mixture was dried at 180° C. The dried hydrated zirconia sol was sintered at 1,160° C. for 2 hours, and was then washed with distilled water and dried at 110° C. in atmospheric air. α-Alumina, terbium oxide, and distilled water were mixed with the resultant to obtain slurry containing powder containing 0.05 wt % of alumina, 0.07 wt % of terbium oxide, and the balance being 5.2 mol % yttria-containing zirconia, by processing the mixture with a ball mill for 22 hours.

After the ball mill processing, an acrylic acid-based binder (acrylic resin) was added to and mixed with the slurry as a binding agent so that the weight ratio of the binder (binding agent) to the powder mixture in the slurry became 3.07 wt %. The mixed slurry was spray-dried at 180° C., and powder granules which had an average aggregation size of 45 μm and contained 3.07 wt % of an acrylic acid-based binder (acrylic resin), 0.05 wt % of alumina, 0.07 wt % of terbium oxide (0.01 mol % as a stabilizer), and the balance being 5.2 mol % yttria-containing zirconia were obtained.

(Zirconia Powder A2)

Powder granules which had an average aggregation size of 45 μm and contained 3.04 wt % of an acrylic acid-based binder, 0.05 wt % of alumina, 0.175 wt % of terbium oxide (0.03 mol % as a stabilizer), and the balance being 4.75 mol % yttria-containing zirconia were obtained through the same method as that for the zirconia powder A1 except that the content of yttria was set to 4.75 mol %, the content of terbium oxide was set to 0.175 wt %, and the acrylic acid-based binder was added to and mixed with slurry so that the weight ratio of the binder to the slurry became 3.04 wt %.

(Zirconia Powders A3 to A14)

A hydrated zirconia sol was obtained by subjecting a zirconium oxychloride aqueous solution to a hydrolysis reaction. Yttrium chloride and/or erbium oxide were added to the hydrated zirconia sol, and the mixture was then dried at 180° C. The dried hydrated zirconia sol was sintered at 1,160° C. for 2 hours, and was then washed with distilled water and dried at 110° C. in atmospheric air. Terbium oxide and/or cobalt oxide, α-alumina, and distilled water were mixed with the resultant to obtain slurry.

Zirconia powders A3 to A14 which had compositions of the following table and contained acrylic acid-based binder, alumina, cobalt oxide, terbium oxide, and the balance being yttria and/or erbia-containing zirconia were obtained through the same method as that for the zirconia powder A1 except that the obtained slurry was used.

TABLE 1

| | $Co_3O_4$ (wt %) | $Tb_4O_7$ (wt % [mol %]) | $Er_2O_3$ (wt % [mol %]) | $Y_2O_3$ (mol %) | $Al_2O_3$ (wt %) | Binding agent (wt %) | Average aggregation size (μm) |
|---|---|---|---|---|---|---|---|
| A3 | 0.001 | 0.015 [0.003] | 0.15 [0.05] | 5.35 | 0.05 | 3.05 | 44 |
| A4 | 0.003 | 0.040 [0.007] | 0.35 [0.12] | 5.12 | 0.05 | 3.04 | 46 |
| A5 | 0.007 | 0.070 [0.012] | 0.65 [0.22] | 4.82 | 0.05 | 3.03 | 45 |
| A6 | 0.002 | 0.015 [0.003] | 0.05 [0.02] | 5.41 | 0.05 | 3.01 | 45 |
| A7 | 0.003 | 0.060 [0.010] | 0.35 [0.12] | 5.04 | 0.05 | 3.01 | 44 |
| A8 | 0.005 | 0.025 [0.004] | 0.05 [0.02] | 5.36 | 0.05 | 3.02 | 47 |
| A9 | 0.015 | 0.100 [0.017] | 0.55 [0.19] | 4.75 | 0.05 | 3.05 | 46 |
| A10 | 0.005 | 0.050 [0.008] | 0.35 [0.12] | 5.08 | 0.05 | 3.04 | 45 |
| A11 | 0.007 | 0.060 [0.010] | 0.15 [0.05] | 5.15 | 0.05 | 3.02 | 46 |
| A12 | 0.002 | 0.015 [0.003] | 0.05 [0.02] | 5.41 | 0.00 | 3.02 | 47 |
| A13 | 0.003 | 0.060 [0.010] | 0.35 [0.12] | 5.04 | 0.01 | 3.01 | 44 |
| A14 | 0.007 | 0.060 [0.010] | 0.15 [0.05] | 5.15 | 0.08 | 3.04 | 44 |

Synthesis Example 2

(Zirconia Powder B1)

Powder granules which had an average aggregation size of 46 μm and contained 3.10 wt % of an acrylic acid-based binder, 0.05 wt % of alumina, 0.07 wt % of terbium oxide (0.01 mol % as a stabilizer), and the balance being 4.0 mol % yttria-containing zirconia were obtained through the same method as that for the zirconia powder A1 except that the content of yttria was set to 4.0 mol % and the acrylic acid-based binder was added to and mixed with slurry so that the weight ratio of the binder to the slurry became 3.10 wt %.

(Zirconia Powder B2)

Powder granules which had an average aggregation size of 46 μm and contained 3.07 wt % of an acrylic acid-based binder, 0.05 wt % of alumina, 0.175 wt % of terbium oxide (0.03 mol % as a stabilizer), and the balance being 4.0 mol % yttria-containing zirconia were obtained through the same method as that for the zirconia powder A1 except that the content of yttria was set to 4.0 mol %, the content of terbium oxide was set to 0.175 wt %, and the acrylic acid-based binder was added to and mixed with slurry so that the weight ratio of the binder to the slurry became 3.07 wt %.

(Zirconia Powders B3 to B11)

A hydrated zirconia sol was obtained by subjecting a zirconium oxychloride aqueous solution to a hydrolysis reaction. Yttrium chloride and erbium oxide were added to the hydrated zirconia sol, and the mixture was then dried at 180° C. The dried hydrated zirconia sol was sintered at 1,160° C. for 2 hours, and was then washed with distilled water and dried at 110° C. in atmospheric air. Terbium oxide and cobalt oxide, α-alumina, and distilled water were mixed with the resultant to obtain slurry.

Zirconia powders B3 to B14 which had compositions of the following table and contained acrylic acid-based binder, alumina, cobalt oxide, terbium oxide, and the balance being yttria and erbia-containing zirconia were obtained through the same method as that for the zirconia powder B1 except that the obtained slurry was used.

TABLE 2

| | $Co_3O_4$ (wt %) | $Tb_4O_7$ (wt % [mol %]) | $Er_2O_3$ (wt % [mol %]) | $Y_2O_3$ (mol %) | $Al_2O_3$ (wt %) | Binding agent (wt %) | Average aggregation size (μm) |
|---|---|---|---|---|---|---|---|
| B3 | 0.001 | 0.015 [0.003] | 0.15 [0.05] | 3.91 | 0.05 | 3.10 | 48 |
| B4 | 0.003 | 0.040 [0.007] | 0.35 [0.12] | 3.77 | 0.05 | 3.11 | 45 |
| B5 | 0.007 | 0.070 [0.012] | 0.65 [0.22] | 3.55 | 0.05 | 3.08 | 47 |
| B6 | 0.002 | 0.015 [0.003] | 0.05 [0.02] | 3.94 | 0.05 | 3.07 | 47 |
| B7 | 0.003 | 0.060 [0.010] | 0.35 [0.12] | 3.77 | 0.05 | 3.07 | 46 |
| B8 | 0.005 | 0.025 [0.004] | 0.05 [0.02] | 3.85 | 0.05 | 3.08 | 45 |
| B9 | 0.015 | 0.100 [0.017] | 0.55 [0.19] | 3.39 | 0.05 | 3.11 | 46 |
| B10 | 0.005 | 0.050 [0.008] | 0.35 [0.12] | 3.72 | 0.05 | 3.13 | 44 |
| B11 | 0.007 | 0.060 [0.010] | 0.15 [0.05] | 3.76 | 0.05 | 3.09 | 48 |

Synthesis Example 3

A hydrated zirconia sol was obtained by subjecting a zirconium oxychloride aqueous solution to a hydrolysis reaction. Yttrium chloride and erbium oxide were added to the hydrated zirconia sol, and the mixture was then dried at 180° C. The dried hydrated zirconia sol was sintered at 1,160° C. for 2 hours, and was then washed with distilled water and dried at 110° C. in atmospheric air. Iron oxyhydroxide and/or cobalt oxide, α-alumina, and distilled water were mixed with the resultant to obtain slurry.

Zirconia powders C1 and C2 which had compositions of the following table and contained acrylic acid-based binder, alumina, iron oxyhydroxide and/or cobalt oxide, and the balance being yttria and erbia-containing zirconia were obtained through the same method as that for the zirconia powder A1 except that the obtained slurry was used.

TABLE 3

| | $Fe_2O_3$ (wt %) | $Co_3O_4$ (wt %) | $Er_2O_3$ (wt % [mol %]) | $Y_2O_3$ (mol %) | $Al_2O_3$ (wt %) | Binding agent (wt %) | Average aggregation size (μm) |
|---|---|---|---|---|---|---|---|
| C1 | 0.047 | 0.003 | 0.10 [0.03] | 5.16 | 0.05 | 3.01 | 46 |
| C2 | 0.062 | 0 | 0.17 [0.06] | 5.03 | 0.05 | 3.02 | 48 |

Synthesis Example 4

Zirconia powders D1 and D2 which contained acrylic acid-based binder, alumina, iron oxyhydroxide and/or cobalt oxide, and the balance being yttria and erbia-containing zirconia were obtained through the same method as that in Synthesis Example 3 except that the compositions of a colorant, a stabilizer, and a binding agent were as shown in the following table.

TABLE 4

|    | $Fe_2O_3$ (wt %) | $Co_3O_4$ (wt %) | $Er_2O_3$ (wt % [mol %]) | $Y_2O_3$ (mol %) | $Al_2O_3$ (wt %) | Binding agent (wt %) | Average aggregation size (μm) |
|----|---|---|---|---|---|---|---|
| D1 | 0.047 | 0.003 | 0.10 [0.03] | 3.89 | 0.05 | 3.06 | 45 |
| D2 | 0.062 | 0     | 0.17 [0.06] | 3.93 | 0.05 | 3.07 | 44 |

Example 1

(Green Body)

A mold having an inner diameter of 48 mm was filled with 25 g of zirconia powder A1, and was then tapped to form a first powder layer. The mold was filled with the same amount of zirconia powder B1 on the first powder layer and tapped. Then, uniaxial press molding was performed at a pressure of 98 MPa. Thereafter, CIP processing was performed at a pressure of 196 MPa to obtain a layered body consisting of two layers, and the obtained layered body was regarded as a green body of the present example. The stabilizer content of the first powder layer was 5.21 mol % and the stabilizer content of the second powder layer was 4.01 mol %. The difference in the yttria content between the layers was 1.2 mol %, and the difference in the binder content was 0.02 wt %. In addition, the colorant content of all of the green body of the present example, the first powder layer, and the second powder layer was 0.07 wt %.

(Calcined Body)

The green body was calcined at a temperature rising rate of 20° C./hour, a calcination temperature of 1,000° C., and a calcination time of 2 hours in atmospheric air to obtain a layered body which was regarded as a calcined body of the present example.

(Sintered Body)

The calcined body was sintered at a temperature rising rate of 100° C./hour, a sintering temperature of 1,500° C., and a sintering time of 2 hours in atmospheric air to obtain a layered body which was regarded as a sintered body of the present example.

The stabilizer content of the sintered body was 4.6 mol %. It was confirmed that ΔL* and ΔC* of the sintered body of the present example were respectively 2.33 and 2.64 and that the sintered body was a layered body having a change in color tone.

The warp was less than a measurement limit (less than 0.03 mm) for all of the green body, the calcined body, and the sintered body.

Example 2

A mold having an inner diameter of 48 mm was filled with 25 g of zirconia powder A2, and was then tapped to form a first powder layer. The mold was filled with the same amount of zirconia powder B2 on the first powder layer and tapped. Then, uniaxial press molding was performed at a pressure of 49 MPa. Thereafter, CIP processing was performed at a pressure of 196 MPa to obtain a layered body which was regarded as a green body of the present example. The stabilizer content of the first powder layer was 4.78 mol % and the stabilizer content of the second powder layer was 4.03 mol %. The difference in the yttria content between the layers was 0.75 mol %, and the difference in the binder content was 0.03 wt %. In addition, the color pigment content of all of the green body of the present example, the first powder layer, and the second powder layer was 0.175 wt %.

A calcined body and a sintered body were obtained through the same method as in Example 1 except that the green body was used.

The stabilizer content of the sintered body was 4.375 mol %. It was confirmed that ΔL* and ΔC* of the sintered body of the present example were respectively 1.13 and 0.34 and that the sintered body was a layered body having a change in color tone.

In can be seen from these examples that a layered body to which a change in color tone is imparted is obtained even though the contents of colorants in the layers are equal to each other.

Example 3

A green body of the present embodiment of which the stabilizer content of a first powder layer was 5.40 mol %, the stabilizer content of a second powder layer was 3.96 mol %, the difference in the stabilizer content between the layers was 1.44 mol %, and the difference in the amount of a binding agent was 0.05 wt % was obtained through the same method as in Example 1 except that the zirconia powders A3 and B3 were used instead of the zirconia powders A1 and B1. The colorant content of all of the green body of the present example, the first powder layer, and the second powder layer was 0.166 wt %.

A calcined body and a sintered body were obtained through the same method as in Example 1 except that the green body was used. The stabilizer content of the sintered body was 4.68 mol %.

ΔL* and ΔC* of the sintered body are respectively 3.99 and 2.16, and the sintered body is a layered body having a change in color tone. In addition, the warp was less than a measurement limit (less than 0.03 mm) for all of the green body, the calcined body, and the sintered body.

Example 4

A green body of the present embodiment of which the stabilizer content of a first powder layer was 5.25 mol %, the stabilizer content of a second powder layer was 3.90 mol %, the difference in the stabilizer content between the layers was 1.35 mol %, and the difference in the amount of a binding agent was 0.07 wt % was obtained through the same method as in Example 1 except that the zirconia powders A4 and B4 were used instead of the zirconia powders A1 and B1. The colorant content of all of the green body of the present example, the first powder layer, and the second powder layer was 0.393 wt %.

A calcined body and a sintered body were obtained through the same method as in Example 1 except that the green body was used. The stabilizer content of the sintered body was 4.58 mol %.

ΔL* and ΔC* of the sintered body are respectively 3.32 and 1.91, and the sintered body is a layered body having a change in color tone. In addition, the warp was less than a measurement limit (less than 0.03 mm) for all of the green body, the calcined body, and the sintered body.

Example 5

A green body of the present embodiment of which the stabilizer content of a first powder layer was 5.05 mol %, the stabilizer content of a second powder layer was 3.78 mol %, the difference in the stabilizer content between the layers was 1.27 mol %, and the difference in the amount of a binding agent was 0.05 wt % was obtained through the same method as in Example 1 except that the zirconia powders A5 and B5 were used instead of the zirconia powders A1 and B1. The colorant content of all of the green body of the present example, the first powder layer, and the second powder layer was 0.727 wt %.

A calcined body and a sintered body were obtained through the same method as in Example 1 except that the green body was used. The stabilizer content of the sintered body was 4.42 mol %.

ΔL* and ΔC* of the sintered body are respectively 2.96 and 1.86, and the sintered body is a layered body having a change in color tone. In addition, the warp was less than a measurement limit (less than 0.03 mm) for all of the green body, the calcined body, and the sintered body.

Example 6

A green body of the present embodiment of which the stabilizer content of a first powder layer was 5.43 mol %, the stabilizer content of a second powder layer was 3.96 mol %, the difference in the stabilizer content between the layers was 1.47 mol %, and the difference in the amount of a binding agent was 0.06 wt % was obtained through the same method as in Example 1 except that the zirconia powders A6 and B6 were used instead of the zirconia powders A1 and B1. The colorant content of all of the green body of the present example, the first powder layer, and the second powder layer was 0.067 wt %.

A calcined body and a sintered body were obtained through the same method as in Example 1 except that the green body was used. The stabilizer content of the sintered body was 4.69 mol %.

ΔL* and ΔC* of the sintered body are respectively 4.20 and 2.80, and the sintered body is a layered body having a change in color tone. In addition, the warp was less than a measurement limit (less than 0.03 mm) for all of the green body, the calcined body, and the sintered body.

Example 7

A green body of the present embodiment of which the stabilizer content of a first powder layer was 5.17 mol %, the stabilizer content of a second powder layer was 3.91 mol %, the difference in the stabilizer content between the layers was 1.26 mol %, and the difference in the amount of a binding agent was 0.06 wt % was obtained through the same method as in Example 1 except that the zirconia powders A7 and B7 were used instead of the zirconia powders A1 and B1. The colorant content of all of the green body of the present example, the first powder layer, and the second powder layer was 0.413 wt %.

A calcined body and a sintered body were obtained through the same method as in Example 1 except that the green body was used. The stabilizer content of the sintered body was 4.54 mol %.

ΔL* and ΔC* of the sintered body are respectively 3.10 and 2.09, and the sintered body is a layered body having a change in color tone. In addition, the warp was less than a measurement limit (less than 0.03 mm) for all of the green body, the calcined body, and the sintered body.

Example 8

A green body of the present embodiment of which the stabilizer content of a first powder layer was 5.38 mol %, the stabilizer content of a second powder layer was 3.87 mol %, the difference in the stabilizer content between the layers was 1.51 mol %, and the difference in the amount of a binding agent was 0.06 wt % was obtained through the same method as in Example 1 except that the zirconia powders A8 and B8 were used instead of the zirconia powders A1 and B1. The colorant content of all of the green body of the present example, the first powder layer, and the second powder layer was 0.08 wt %.

A calcined body and a sintered body were obtained through the same method as in Example 1 except that the green body was used. The stabilizer content of the sintered body was 4.63 mol %.

ΔL* and ΔC* of the sintered body are respectively 3.67 and 2.37, and the sintered body is a layered body having a change in color tone. In addition, the warp was less than a measurement limit (less than 0.03 mm) for all of the green body, the calcined body, and the sintered body.

Example 9

A green body of the present embodiment of which the stabilizer content of a first powder layer was 4.95 mol %, the stabilizer content of a second powder layer was 3.59 mol %, the difference in the stabilizer content between the layers was 1.36 mol %, and the difference in the amount of a binding agent was 0.06 wt % was obtained through the same method as in Example 1 except that the zirconia powders A9 and B9 were used instead of the zirconia powders A1 and B1. The colorant content of all of the green body of the present example, the first powder layer, and the second powder layer was 0.665 wt %.

A calcined body and a sintered body were obtained through the same method as in Example 1 except that the green body was used. The stabilizer content of the sintered body was 4.27 mol %.

ΔL* and ΔC* of the sintered body are respectively 2.20 and 2.64, and the sintered body is a layered body having a change in color tone. In addition, the warp was less than a measurement limit (less than 0.03 mm) for all of the green body, the calcined body, and the sintered body.

Example 10

A green body of the present embodiment of which the stabilizer content of a first powder layer was 5.21 mol %, the stabilizer content of a second powder layer was 3.85 mol %, the difference in the stabilizer content between the layers was 1.36 mol %, and the difference in the amount of a binding agent was 0.09 wt % was obtained through the same method as in Example 1 except that the zirconia powders A10 and B10 were used instead of the zirconia powders A1 and B1. The colorant content of all of the green body of the present example, the first powder layer, and the second powder layer was 0.405 wt %.

A calcined body and a sintered body were obtained through the same method as in Example 1 except that the green body was used. The stabilizer content of the sintered body was 4.53 mol %.

$\Delta L^*$ and $\Delta C^*$ of the sintered body are respectively 3.70 and 1.83, and the sintered body is a layered body having a change in color tone. In addition, the warp was less than a measurement limit (less than 0.03 mm) for all of the green body, the calcined body, and the sintered body.

Example 11

A green body of the present embodiment of which the stabilizer content of a first powder layer was 5.22 mol %, the stabilizer content of a second powder layer was 3.82 mol %, the difference in the stabilizer content between the layers was 1.39 mol %, and the difference in the amount of a binding agent was 0.07 wt % was obtained through the same method as in Example 1 except that the zirconia powders A11 and B11 were used instead of the zirconia powders A1 and B1. The colorant content of all of the green body of the present example, the first powder layer, and the second powder layer was 0.217 wt %.

A calcined body and a sintered body were obtained through the same method as in Example 1 except that the green body was used. The stabilizer content of the sintered body was 4.52 mol %.

$\Delta L^*$ and $\Delta C^*$ of the sintered body are respectively 3.30 and 2.28, and the sintered body is a layered body having a change in color tone. In addition, the warp was less than a measurement limit (less than 0.03 mm) for all of the green body, the calcined body, and the sintered body.

Example 12

A green body of the present embodiment of which the stabilizer content of a first powder layer was 5.40 mol %, the stabilizer content of a second powder layer was 3.96 mol %, the difference in the stabilizer content between the layers was 1.44 mol %, and the difference in the amount of a binding agent was 0.05 wt % was obtained through the same method as in Example 1 except that a mold having an inner diameter of 110 mm was used, uniaxial press molding was performed at a pressure of 19.8 MPa, and the zirconia powders A3 and B3 were used instead of the zirconia powders A1 and B1. The colorant content of all of the green body of the present example, the first powder layer, and the second powder layer was 0.166 wt %.

A calcined body and a sintered body were obtained through the same method as in Example 1 except that the green body was used. The stabilizer content of the sintered body was 4.68 mol %.

$\Delta L^*$ and $\Delta C^*$ of the sintered body are respectively 3.99 and 2.16, and the sintered body is a layered body having a change in color tone. The warps of the green body, the calcined body, and the sintered body were respectively 0.05 mm, 0.09 mm, and 0.05 mm, and the deformation amounts thereof were respectively 0.05, 0.09, and 0.06.

Example 13

A green body of the present embodiment of which the stabilizer content of a first powder layer was 5.43 mol %, the stabilizer content of a second powder layer was 3.96 mol %, the difference in the stabilizer content between the layers was 1.47 mol %, and the difference in the amount of a binding agent was 0.06 wt % was obtained through the same method as in Example 1 except that a mold having an inner diameter of 110 mm was used and the zirconia powders A6 and B6 were used. The colorant content of all of the green body of the present example, the first powder layer, and the second powder layer was 0.067 wt %.

A calcined body and a sintered body were obtained through the same method as in Example 1 except that the green body was used. The stabilizer content of the sintered body was 4.69 mol %.

$\Delta L^*$ and $\Delta C^*$ of the sintered body are respectively 4.20 and 2.80, and the sintered body is a layered body having a change in color tone. In addition, the warp was less than a measurement limit (less than 0.03 mm) for all of the green body and the sintered body. However, the calcined body had a warp of 0.06 mm and a deformation amount of 0.06.

Example 14

A green body of the present embodiment of which the stabilizer content of a first powder layer was 5.17 mol %, the stabilizer content of a second powder layer was 3.91 mol %, the difference in the stabilizer content between the layers was 1.26 mol %, and the difference in the amount of a binding agent was 0.06 wt % was obtained through the same method as in Example 1 except that a mold having an inner diameter of 110 mm was used and the zirconia powders A13 and B7 were used. The colorant content of all of the green body of the present example, the first powder layer, and the second powder layer was 0.413 wt %.

A calcined body and a sintered body were obtained through the same method as in Example 1 except that the green body was used. The stabilizer content of the sintered body was 4.54 mol %.

$\Delta L^*$ and $\Delta C^*$ of the sintered body are respectively 3.27 and 2.25, and the sintered body is a layered body having a change in color tone. In addition, the warp was less than a measurement limit (less than 0.03 mm) for all of the green body and the sintered body. However, the calcined body had a warp of 0.19 mm and a deformation amount of 0.18.

Example 15

A green body of the present embodiment of which the stabilizer content of a first powder layer was 5.22 mol %, the stabilizer content of a second powder layer was 3.82 mol %, the difference in the stabilizer content between the layers was 1.40 mol %, and the difference in the amount of a binding agent was 0.05 wt % was obtained through the same method as in Example 1 except that a mold having an inner diameter of 110 mm was used and the zirconia powders A14 and B11 were used. The colorant content of all of the green body of the present example, the first powder layer, and the second powder layer was 0.217 wt %.

A calcined body and a sintered body were obtained through the same method as in Example 1 except that the green body was used. The stabilizer content of the sintered body was 4.52 mol %.

$\Delta L^*$ and $\Delta C^*$ of the sintered body are respectively 3.14 and 2.22, and the sintered body is a layered body having a change in color tone. In addition, the green body had a warp of less than a measurement limit (less than 0.03 mm). However, the calcined body and the sintered body respectively had warps of 0.19 mm and 0.03 mm and respectively had deformation amounts of 0.18 and 0.04.

It was confirmed from these examples that the warp of a calcined body tends to be particularly suppressed as the difference in the content of alumina between layers is smaller.

Example 16

A green body of the present embodiment of which the stabilizer content of a first powder layer was 5.19 mol %, the stabilizer content of a second powder layer was 3.93 mol %, the difference in the stabilizer content between the layers was 1.26 mol %, and the difference in the amount of a binding agent was 0.05 wt % was obtained through the same method as in Example 1 except that a mold having an inner diameter of 110 mm was used, uniaxial press molding was performed at a pressure of 98 MPa, and the zirconia powders C1 and D1 were used instead of the zirconia powders A1 and B1. The colorant content of all of the green body of the present example, the first powder layer, and the second powder layer was 0.150 wt %.

A calcined body and a sintered body were obtained through the same method as in Example 1 except that the green body was used. The stabilizer content of the sintered body was 4.56 mol %.

$\Delta L^*$ and $\Delta C^*$ of the sintered body are respectively 4.27 and 2.92, and the sintered body is a layered body having a change in color tone. In addition, the warp was less than a measurement limit (less than 0.03 mm) for all of the green body and the sintered body. However, the calcined body had a warp of 0.12 mm and a deformation amount of 0.11.

Example 17

A green body of the present embodiment of which the stabilizer content of a first powder layer was 5.09 mol %, the stabilizer content of a second powder layer was 3.99 mol %, the difference in the stabilizer content between the layers was 1.10 mol %, and the difference in the amount of a binding agent was 0.05 wt % was obtained through the same method as in Example 1 except that a mold having an inner diameter of 110 mm was used, uniaxial press molding was performed at a pressure of 98 MPa, and the zirconia powders C2 and D2 were used instead of the zirconia powders A1 and B1. The colorant content of all of the green body of the present example, the first powder layer, and the second powder layer was 0.232 wt %.

A calcined body and a sintered body were obtained through the same method as in Example 1 except that the green body was used. The stabilizer content of the sintered body was 4.54 mol %.

$\Delta L^*$ and $\Delta C^*$ of the sintered body are respectively 4.93 and 2.71, and the sintered body is a layered body having a change in color tone. In addition, the warp was less than a measurement limit (less than 0.03 mm) for all of the green body and the sintered body. However, the calcined body had a warp of 0.16 mm and a deformation amount of 0.15.

Comparative Example 1

A mold having an inner diameter of 110 mm was filled with 25 g of zirconia powder consisting of 0.094 wt % of iron oxide, 0.0045 wt % of cobalt oxide, and the balance being 4 mol % yttria-containing zirconia, and was then tapped to form a first powder layer. The mold was filled with the same amount of zirconia powder consisting of 4 mol % yttria-containing zirconia on the first powder layer and tapped to form a second powder layer. Then, uniaxial press molding was performed at a pressure of 98 MPa. Thereafter, CIP processing was performed at a pressure of 196 MPa to obtain a layered body consisting of two layers, and the obtained layered body was regarded as a green body of the present comparative example. The difference in the yttria content between the layers was 0 mol % and the difference in the amount of the binding agent between the layers was 0.02 wt %.

A calcined body was produced through the same method as in Example 1 except that the green body was used. The warp of the calcined body was 0.67 mm.

There was a large warp generated in the calcined body of the present comparative example in which the first layer and the second layer have the same yttria content as each other and have different colorant contents by 0.139 wt %.

Reference Example 1

The mold having an inner diameter of 48 mm was filled with the zirconia powder A1 and tapped. Then, uniaxial press molding was performed at a pressure of 49 MPa. Thereafter, CIP processing was performed at a pressure of 196 MPa to obtain a green body.

A calcined body and a sintered body were obtained through the same method as in Example 1 except that the green body was used.

The obtained sintered body contained 0.05 wt % of alumina and the balance being 5.2 mol % yttria and 0.01 mol % terbium oxide-containing zirconia. The crystal phase of the sintered body consisted of a tetragonal crystal and a cubic crystal while the tetragonal crystal was a main phase. In addition, the total light transmittance of the sintered body was 42%.

Reference Example 2

The mold having an inner diameter of 48 mm was filled with the zirconia powder A2 and tapped. Then, uniaxial press molding was performed at a pressure of 49 MPa. Thereafter, CIP processing was performed at a pressure of 196 MPa to obtain a green body.

A calcined body and a sintered body were obtained through the same method as in Example 1 except that the green body was used.

The obtained sintered body contained 0.05 wt % of alumina and the balance being 4.75 mol % yttria and 0.03 mol % terbium oxide-containing zirconia. The crystal phase of the sintered body consisted of a tetragonal crystal and a cubic crystal while the tetragonal prime was a main phase. In addition, the total light transmittance of the sintered body was 40%.

Reference Example 3

The mold having an inner diameter of 48 mm was filled with the zirconia powder B1 and tapped. Then, uniaxial press molding was performed at a pressure of 49 MPa. Thereafter, CIP processing was performed at a pressure of 196 MPa to obtain a green body.

A calcined body and a sintered body were obtained through the same method as in Example 1 except that the green body was used.

The obtained sintered body contained 0.05 wt % of alumina and the balance being 4.0 mol % yttria and 0.01 mol % terbium oxide-containing zirconia. The crystal phase of the sintered body consisted of a tetragonal crystal and a cubic crystal while the tetragonal crystal was a main phase. In addition, the color tones of the sintered body were 78.51 for L*, 0.18 for a*, and 25.06 for b*, and the total light transmittance was 40%.

Reference Example 4

The mold having an inner diameter of 48 mm was filled with the zirconia powder B2 and tapped. Then, uniaxial press molding was performed at a pressure of 49 MPa. Thereafter, CIP processing was performed at a pressure of 196 MPa to obtain a greenbody.

A calcined body and a sintered body were obtained through the same method as in Example 1 except that the green body was used.

The obtained sintered body contained 0.05 wt % of alumina and the balance being 4.0 mol % yttria and 0.03 mol % terbium oxide-containing zirconia. The crystal phase of the sintered body consisted of a tetragonal crystal and a cubic crystal while the cubic crystal was a main phase. In addition, the color tones of the sintered body were 77.88 for L*, 6.02 for a*, and 31.70 for b*, and the total light transmittance was 38%.

The entire contents of the specifications, claims, drawings, and abstracts of Japanese Patent Application Nos. 2019-041310 and 2019-041321, filed Mar. 7, 2019 are incorporated by reference as a disclosure of the specification of the present disclosure.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

100, 200, 300, 400: zirconia sintered body
11, 21: first layer
12, 22: second layer
23: third layer
32A, 32B: thickness gauge
33: size of sintered body
41: load
42: fulcrum points distance
51: zirconia having necking structure.

What is claimed is:

1. A layered body which has a structure, in which two or more layers containing stabilizer-containing zirconia and a colorant are layered, and in which types and contents of the colorants contained in the layers are equal to each other, the layered body comprising at least:
    a first layer containing a colorant and zirconia which has a stabilizer content of higher than or equal to 4 mol %;
    a second layer containing a colorant and zirconia which has a stabilizer content different from that of the zirconia contained in the first layer;
    wherein the content of the stabilizer of the stabilizer-containing zirconia contained in the second layer is 4.5 mol % to 7.0 mol %; and
    the stabilizer includes one or more selected from the group consisting of yttria, calcia, magnesia, and ceria; and
    a difference between the stabilizer content in the first layer and the stabilizer content in the second layer is greater than or equal to 0.5 mol %.

2. The layered body according to claim 1, wherein the content of the stabilizer of the stabilizer-containing zirconia contained in the second layer is 5.0 mol % to 6.0 mol %.

3. The layered body according to claim 1, wherein the content of the stabilizer of the stabilizer-containing zirconia contained in the first layer is 4.1 mol % to 5.5 mol %.

4. The layered body according to claim 1, wherein the stabilizer is any of yttria or ceria.

5. The layered body according to claim 1, wherein the colorant is at least any of a transition metal element or a lanthanoid-based rare earth element.

6. The layered body according to claim 1, wherein the content of the colorant is 0.01 wt % to 1.0 wt %.

7. The layered body according to claim 1, wherein at least one of the layers contains alumina.

8. The layered body according to claim 1, wherein a warp measured using a thickness gauge according to JIS B 7524:2008 is less than or equal to 1.0 mm.

9. The layered body according to claim 1, wherein a warp measured using a thickness gauge according to JIS B 7524:2008 is less than or equal to 0.2 mm.

10. The layered body according to claim 1, wherein the layered body is a sintered body.

11. The layered body according to claim 1, further comprising:
    a zirconia layer of which a total light transmittance with respect to a CIE standard light source D65 at a sample thickness of 1.0 mm is 30% to 50%.

12. The layered body according to claim 1, wherein the layered body is a calcined body.

13. A method for producing the layered body according to claim 1, comprising:
    sintering a green body at 1,200° C. to 1,600° C.,
    wherein the green body has a structure, in which two or more powder composition layers consisting of a powder composition containing a stabilizer-containing zirconia, a colorant, and a binding agent are layered, and in which types and contents of the colorants contained in the powder composition layers are equal to each other,
    includes at least a first powder composition layer containing a binding agent, a color pigment, and zirconia which has a stabilizer content of higher than or equal to 4 mol % and
    a second powder composition layer containing a binding agent, a colorant, and zirconia which has a stabilizer content different from that of the zirconia contained in the first powder composition layer, and
    has a difference in a binding agent content between the first powder composition layer and the second powder composition layer exceeds 0.01 wt %.

14. A method for producing the layered body according to claim 1, comprising:
    calcining a green body at a temperature of higher than or equal to 800° C. and lower than 1,200° C. to obtain a calcined body; and
    sintering the calcined body at 1,200° C. to 1,600° C.,
    wherein the green body has a structure, in which two or more powder composition layers consisting of a powder composition containing a stabilizer-containing zirconia, a colorant, and a binding agent are layered, and in which types and contents of the colorants contained in the powder composition layers are equal to each other, includes at least a first powder composition layer containing a binding agent, a colorant, and zirconia which has a stabilizer content of higher than or equal to 4 mol % and a second powder composition layer containing a binding agent, a colorant, and zirconia which has a stabilizer content different from that of the zirconia contained in the first powder composition layer, and has a difference in a binding agent content between the first powder composition layer and the second powder composition layer exceeds 0.01 wt %.

15. A method for producing the layered body according to claim 1, comprising:

calcining a green body at a temperature of higher than or equal to 800° C. and lower than 1,200° C., wherein the green body has a structure, in which two or more powder composition layers consisting of a powder composition containing a stabilizer-containing zirconia, a colorant, and a binding agent are layered, and in which types and contents of the colorants contained in the powder composition layers are equal to each other, includes at least a first powder composition layer containing a binding agent, a colorant, and zirconia which has a stabilizer content of higher than or equal to 4 mol % and a second powder composition layer containing a binding agent, a colorant, and zirconia which has a stabilizer content different from that of the zirconia contained in the first powder composition layer, and has a difference in a binding agent content between the first powder composition layer and the second powder composition layer exceeds 0.01 wt %.

16. The production method according to claim 13, wherein the binding agent is one or more selected from the group consisting of polyvinyl alcohol, polyvinyl butyrate, wax, and acrylic resin.

17. The production method according to claim 13, wherein the powder composition contained in the powder composition layers is granulated powder.

18. A dental material containing the layered body according to claim 1.

* * * * *